(12) United States Patent
Kim

(10) Patent No.: US 6,920,491 B2
(45) Date of Patent: Jul. 19, 2005

(54) FABRIC DEVICE CONFIGURATION INTERFACE FOR ONLINING FABRIC DEVICES FOR USE FROM A HOST SYSTEM

(75) Inventor: Hyon T. Kim, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 775 days.

(21) Appl. No.: 09/843,494

(22) Filed: Apr. 25, 2001

(65) Prior Publication Data

US 2003/0023705 A1 Jan. 30, 2003

(51) Int. Cl.⁷ .............................................. G06F 15/177
(52) U.S. Cl. ...................... 709/220; 709/221; 709/222; 709/223; 709/224; 709/225; 709/226
(58) Field of Search ................................ 709/220–226

(56) References Cited

U.S. PATENT DOCUMENTS

| | | |
|---|---|---|
| 5,600,791 A | 2/1997 | Carlson et al. |
| 5,805,924 A | 9/1998 | Stoevhase |
| 5,941,972 A | 8/1999 | Hoese et al. |
| 5,944,798 A | 8/1999 | McCarty et al. |
| 6,182,167 B1 | 1/2001 | Basham et al. |
| 6,199,112 B1 | 3/2001 | Wilson |
| 6,393,489 B1 | 5/2002 | Sambamurthy et al. |
| 6,446,141 B1 | 9/2002 | Nolan et al. |
| 6,538,669 B1 | 3/2003 | Lagueux, Jr. et al. |
| 6,584,499 B1 | 6/2003 | Jantz et al. |
| 6,594,698 B1 | 7/2003 | Chow et al. |
| 6,643,748 B1 | 11/2003 | Wieland |
| 6,665,714 B1 | 12/2003 | Blumenau et al. |
| 2001/0047482 A1 | 11/2001 | Harris et al. |

FOREIGN PATENT DOCUMENTS

| | | |
|---|---|---|
| EP | 989 490 | 3/2000 |
| EP | 1 085 414 | 3/2001 |
| WO | 98/18306 | 5/1998 |
| WO | 01/14987 | 3/2001 |

OTHER PUBLICATIONS

Harris, et al., "Distributed Storage Resource Management in a Storage Area Network," U.S. Publication No. 2001/0047482, published Nov. 29, 2001, 15 pages.

(Continued)

Primary Examiner—Jeffrey Gaffin
Assistant Examiner—Niketa Patel
(74) Attorney, Agent, or Firm—Robert C. Kowert; Meyertons, Hood, Kivlin, Kowert & Goetzel, P.C.

(57) ABSTRACT

A fabric configuration interface may provide for storing multiple configuration repositories identifying different configurations of fabric devices for a host system coupled to a fabric. Each configuration repository identifies one or more fabric devices. The fabric configuration interface may receive a request to online fabric devices according to a specified one of the configuration repositories. In response to such a request, the configuration repository may access the specified configuration repository and request a configuration operation to configure, for the host system, the fabric devices identified in the specified configuration repository according. The fabric configuration interface may provide for requesting that fabric devices listed in a specified configuration repository be onlined or offlined. The fabric configuration interface may also provide for deleting entries from a specified configuration repository.

50 Claims, 15 Drawing Sheets

OTHER PUBLICATIONS

Khattar, et al., "Introduction to Storage Area Network, SAN," IBM, SG24–5470–00. International Technical Support Organization, Aug. 1999, 54 pages.

"Open SANs, An In–Dept Brief," Version 1.1, Dec. 2000, 10 pages.

American National Standards Institute *for Information Technology* "Fibre Channel—General Services–3 (FC–GS–3)," ANSI NCITS 348–2001, 2001 Information Technology Industry Council, 261 pages.

American National Standards Institute *for Information Technology* "Fibre Channel—Switch Fabric (FC–SW)," ANSI NCITS 321–1998, 1998 Information Technology Industry Council, 108 pages.

American National Standards Institute *for Information Technology* "Fibre Channel Arbitrated Loop (FC–AL–2)," ANSI NCITS 332–1999, 1999 Information Technology Industry Council, 149 pages.

American National Standards Institute *for Information Technology* "Fibre Channel—Arbitrated Loop (FC–AL)," ANSI X3.272–1996, 1996 Information Technology Industry Council, 102 pages.

American National Standards Institute *for Information Technology* "Fibre Channel—Fabric Generic Requirements (FC–FG)," ANSI X3.289–1996, 1997 Information Technology Industry Council, 33 pages.

FABRIC DEVICE CONFIGURATION INTERFACE FOR ONLINING FABRIC DEVICES FOR USE FROM A HOST SYSTEM

BACKGROUND OF THE INVENTION

1. Field of the Invention

This invention relates to host system configuration of devices attached to a fabric in a storage network.

2. Description of the Related Art

Storage area networks, also referred to as SANs, are dedicated networks that connect one or more systems to storage devices and subsystems. Today, fiber channel is one of the leading technologies for SANs. In general, fiber channel encompasses three networking topologies: point-to-point, loop, and fabric. In a point-to-point topology, a fiber channel host adapter in a system is typically connected to a single fiber channel storage subsystem. In a fiber channel loop network, also called an arbitrated loop, the loop is constructed by connecting nodes together in a single logical ring. Loops can be constructed by connecting nodes through a fiber channel hub in a star-wired topology or by connecting them together in a connected physical loop from node to node. In a fiber channel fabric topology, the storage networks are constructed with network switches. A fabric can be composed of a single switch or multiple switches. Ports on fabric networks connect nodes to switches on low-latency, point-to-point connections.

The nodes connected in the loop and fabric topologies refer to "network nodes" and can be any entity that is able to send or receive transmissions in a fiber channel network. For example, a node can be a computer system, a storage device/subsystem, a storage router/bridge that connects SCSI equipment, a printer, a scanner, or any other equipment, such as data capture equipment. The ANSI X3.272-1996 specification entitled "FC-AL, Fiber Channel Arbitrated Loop" and the ANSI X3.T11 Project 1133-D specification entitled "FC-AL-2, Fiber Channel Arbitrated Loop" describe examples of fiber channel loop topologies in further detail. The ANSI X3.T11 Project 959-D specification entitled "FC-SW Fiber Channel Switch Fabric" describes an example of a fiber channel fabric in further detail. Note that the most recent versions of these and related specifications may be obtained from the T11 technical committee of the National Committee for Information Technology Standards (NCITS).

For point-to-point topologies and loop topologies, device drivers executing on a host computer perform device discovery at host boot-up to determine locally connected devices. The discovered devices are configured to be accessible to applications running on the host by creating a node for each device within the host. These types of nodes are referred to as operating system device nodes. Each node functions as an internal (to the host) representation of an attached device and provides a communication path to the device. Since the number of devices attached to a host in point-to-point and loop topologies are limited, the discovery process may be completed within an acceptable time frame. Due to the number of devices capable of being attached to a fabric, discovering all fabric devices available to the host at host boot-up may not be feasible. Additionally, a host computer may desire to maintain its fabric device configuration across reboots and adjust for changes in the fabric.

SUMMARY OF THE INVENTION

Methods, systems, and programs for discovering devices in a storage network are described for various embodiments of the present invention. A fabric configuration interface may provide for storing multiple configuration repositories identifying different configurations of fabric devices for a host system coupled to a fabric. Each configuration repository identifies one or more fabric devices. The fabric configuration interface may receive a request to online fabric devices according to a specified one of the configuration repositories. In response to such a request, the configuration repository may access the specified configuration repository and request a configuration operation to configure, for the host system, some or all of the fabric devices identified in the specified configuration repository according. The fabric configuration interface may provide for requesting that fabric devices listed in a specified configuration repository be onlined or offlined. The fabric configuration interface may also provide for deleting entries from a specified configuration repository.

In some embodiments, a host system may include one or more adapter ports for connecting to a fabric. The host system may also include a fabric driver configured to interface the host system to the fabric and a fabric configuration interface configured to manage a plurality of different configuration repositories. Each configuration repository may indicate a specific fabric device configuration for the host system. The fabric configuration interface is configured to provide a standard interface for creating the different configuration repositories. The fabric configuration interface is also configured to provide a standard interface for requesting a configuration operation according to configuration information stored in a specified configuration repository. The fabric configuration interface may also provide an interface for modifying and/or verifying information in the configuration repositories.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

Figure 1:
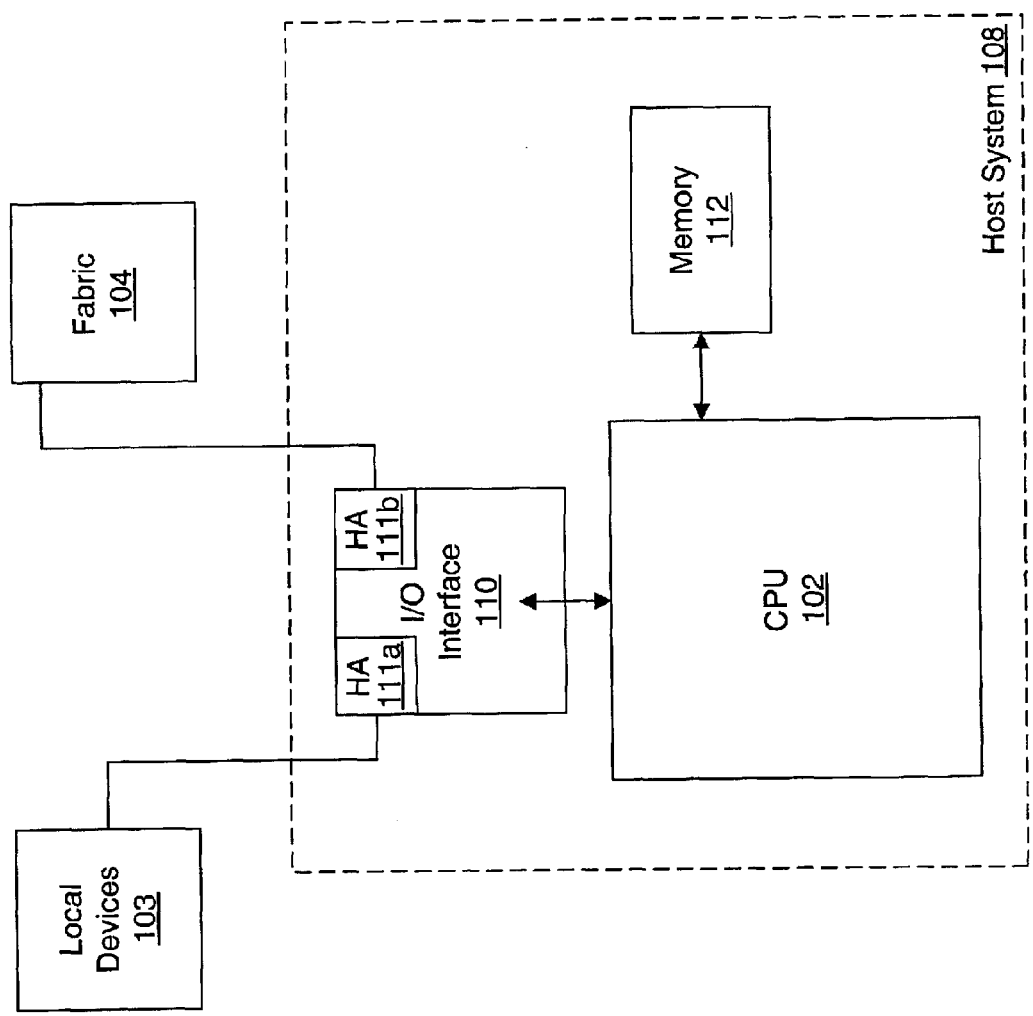
FIG. 1 illustrates a host computer attached to a fabric and one or more local devices.

FIG. 1 illustrates a host system 108 attached to a fabric 104, which is suitable for implementing various embodiments of the present invention. The host system 108 may include at least one central processing unit (CPU) or processor 102. The CPU 102 may be coupled to a memory 112. The memory 112 is representative of various types of possible memory media (also referred to as "computer readable media"): for example, hard disk storage, floppy disk storage, removable disk storage, flash memory or random access memory (RAM). The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution.

As shown in FIG. 1 the memory 112 permits two-way access: it is readable and writable. The memory 112 may store instructions and/or data which implement all or part of the system and method described in detail herein, and the memory 112 may be utilized to install the instructions and/or data. In various embodiments, the host system 108 may take various forms, including a personal computer system, desktop computer, laptop computer, palmtop computer, mainframe computer system, workstation, network appliance, network computer, Internet appliance, personal digital assistant (PDA), embedded device, smart phone, television system, or other suitable device. In general, the term "computer system" may be broadly defined to encompass any device having a processor which executes instructions from a memory medium.

The host system 108 may be coupled to a fabric 104, which may provide access to a plurality of fabric attached devices, such as persistent storage devices or other computer peripheral devices. The CPU 102 may acquire instructions and/or data through an input/output interface 110. Through the input/output interface 110, the CPU 102 may also be coupled to one or more local devices 103, such as local input/output devices (video monitors or other displays, track balls, mice, keyboards, etc.) local storage devices (hard drives, optical storage devices, etc.), local printers, plotters, scanners, and any other type of local I/O devices for use with a host system 108. Some local devices may be referred to as direct attach devices. Input/output interface 110 may include host adapters 111a and 111b for coupling to local devices 103 and fabric 104 respectively. Host adapters 111a and 111b may be fiber channel adapters (FCAs). In one embodiment, one or more of the local devices may be included in the host system 108, such as in expansion slots of the host system 108. In one embodiment, one or more of the local devices may be externally connected to the host system 108.

The host system 108 may be operable to execute one or more computer programs. The computer programs may comprise operating system or other system software, application software, utility software, Java™ applets, and/or any other sequence of instructions. Typically, an operating system (OS) performs basic tasks such as recognizing input from the keyboard, sending output to the display screen, keeping track of files and directories on the disk, and controlling peripheral devices such as disk drives and printers. Application software runs on top of the operating system and provides additional functionality. In one embodiment, the OS may be based on Sun Microsystems's Solaris™ operating system. The computer programs may be stored in a memory medium or storage medium such as the memory 112, or they may be provided to the CPU 102 through the fabric 104 or I/O interface 110.

Figure 2:
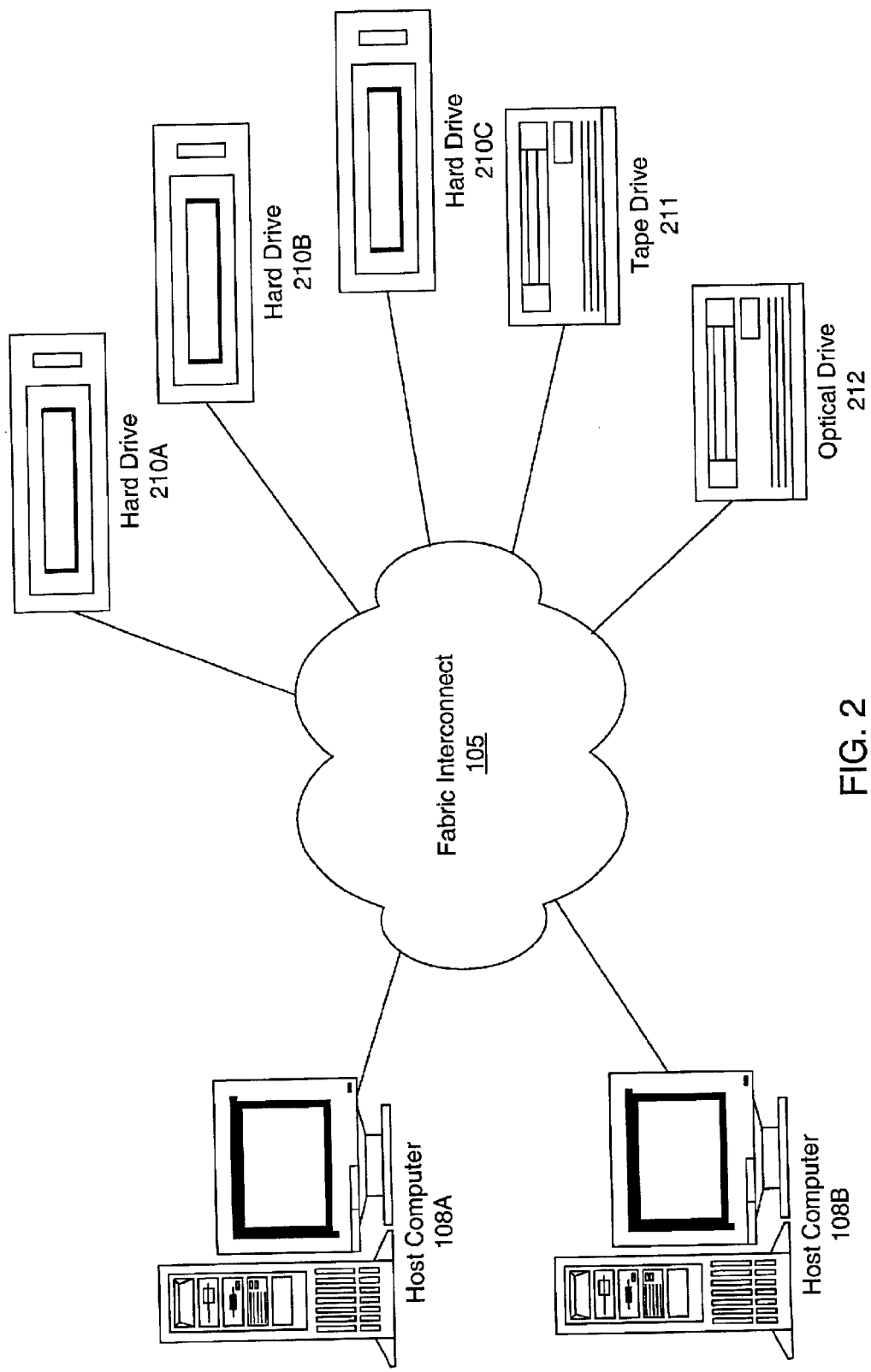
FIG. 2 illustrates an example of a storage area network (SAN) suitable for implementing various embodiments of the present invention.

FIG. 2 illustrates an example of a SAN coupled to host computers 108A and 108B. The SAN shown in FIG. 2 includes a fabric interconnect 105 coupled to hard drives 210A, 210B, and 210C, tape drive 211, and optical drive 212. Hard drives 210A, 210B, and 210C, tape drive 211, and optical drive 212 are also referred to as fabric devices. It should be noted that the number and types of hosts and devices shown in FIG. 2 are for illustration purposes only, and the actual number and types of hosts and/or devices in a SAN may vary. Fabric interconnect 105 may include one or more switches which are connected to the network nodes with an optical, copper cable, or other type of cable or interconnect medium.

Figure 4:
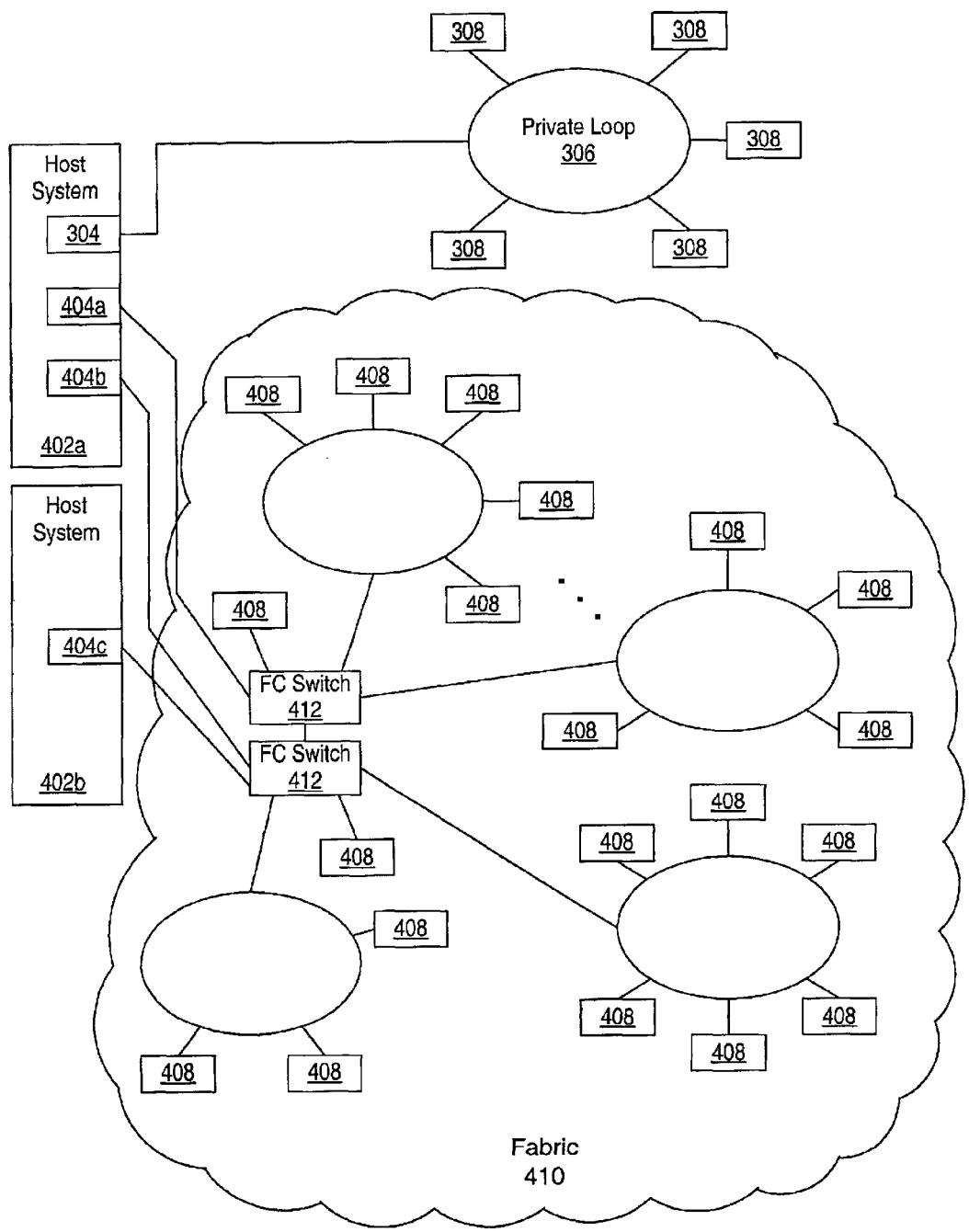
FIG. 4 illustrates an example of a storage network suitable for implementing various embodiments of the present invention.

FIG. 4 illustrates an example of a storage network which includes a direct attached private loop 306 and a fabric 410. It should be noted that storage networks may be configured in a variety of different ways and many include one or more direct attach devices, SANs, and/or network attach (NAS) devices. Furthermore, it should be noted that fabrics and/or SANs are not limited to fiber channel technologies and architectures but may include various types of technologies. For example, some or all of a SAN may be based on the InfiniBand™ Architecture or SCSI (SCSI over IP).

Host adapter 304 couples host system 402a to private loop 306 and adapters 404a and 404b couples host system 402b to fabric 410. Note that host adapters 304, 404a and 404b may be separate host bus adapter cards, for example. In other embodiments, host adapters 304, 404a and 404b may each refer to a separate host adapter port. Coupled to private loop 306 are one or more direct attach devices 308. Direct attach device(s) 308 are considered local to host system 402a.

The host system 402b is coupled to fabric 410 via host adapter 404c. Fabric 410 includes fiber channel switches 412 which are coupled to multiple fabric devices 408. Each fiber channel switch may connect to various fiber channel topologies such as point-to-point fiber channel connections or fiber channel loops. Each switch may also connect to one or more other fiber channel switches. The fabric devices 408 may be various storage devices such as hard disk drives, optical drives, tape drives, etc. In some embodiments fabric devices 408 may be any type of I/O device such as storage devices, printers, scanners, etc. as are used in conjunction with computer systems.

Due to the large number of devices which may be present in fabric 410, the time required for a host system 402 to discover and online all of the devices available through fabric 410 may be impractical. Furthermore, it may be unlikely that host system 402 actually needs to communicate with all of the various fabric devices 408. The term "online" may be used herein to refer to creating a node to provide a communication mechanism or path to a device.

Figure 5:
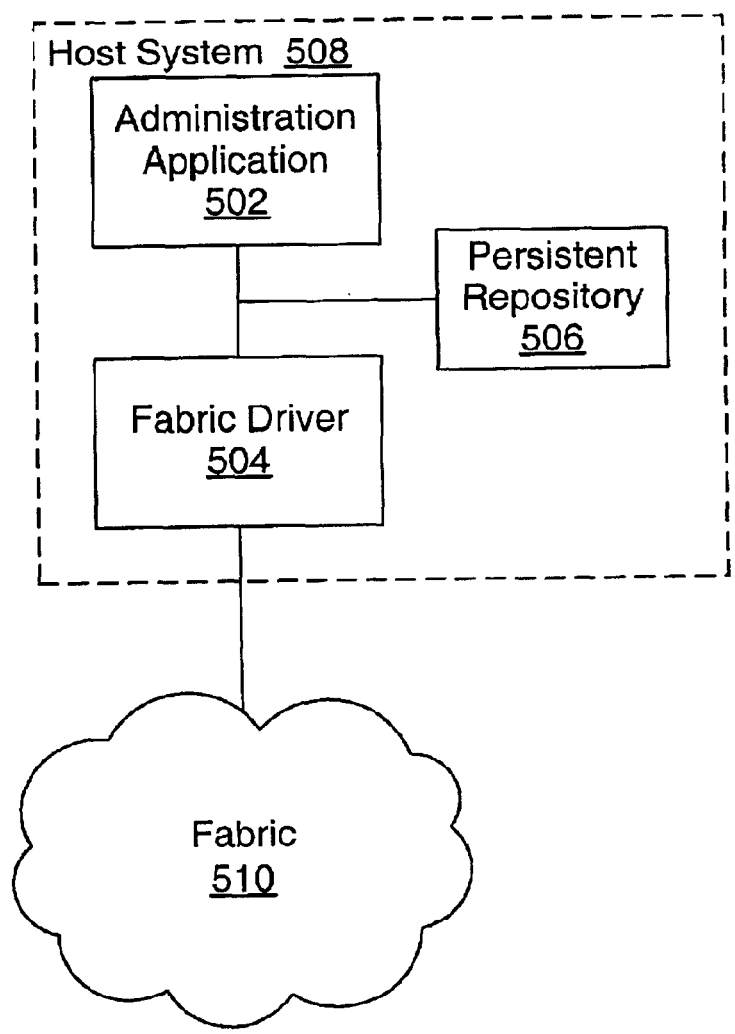
FIG. 5 is an illustration of a host computer coupled to a fabric according to one embodiment of the present invention.

FIG. 5 illustrates a host system 508 coupled to a fabric 510 according to one embodiment of the present invention. The fabric 510 may be implemented with one or more switches coupled to one or more storage devices or subsystems. Furthermore, it should be noted that fabric 510 is not limited fiber channel fabrics but my be extended to any type of switched storage network. A fabric driver 504 provides an interface between host system 508 and fabric 510. A persistent repository 506 is a data structure that stores information on the current status of the fabric devices. An administration application 502 is a software program running on host system 508 and accessible to a system administrator. Administration application 502 provides a mechanism for discovering fabric devices on-demand with user input thereby eliminating the need to discover all fabric devices accessible to a host system at one time. As such, nodes can be created only for selected fabric devices (i.e., a subset of available fabric devices) during a discovery process. It should be noted that if a node is already created for a selected fabric device, it may not be necessary to re-create the node.

During a discovery process, administration application 502 may query a fabric driver 504 for a list of devices visible to the host system 508. Fabric driver 504 provides an interface for the host system to the fabric. Fabric driver 504 may be part of the operating system for the host system and may include one or more modules for handling various functions required to interface the host system to the fabric such as protocol handling and transport layer operations. In one embodiment of the present invention, the fabric driver 504 may be a Solaris kernel module or modules. The fabric driver 504 may provide the requested list of devices to the administration application 502. A subset of these devices may then be selected through administration application 502 and brought online by fabric driver 504 so that the subset of devices are accessible from host system 508. Onlining the subset of devices may include the creation of a node within the operating system for each device wherein the node provides a reference for applications or other processes in host system 508 to reference a corresponding device in fabric 510. Thus, a node provides a path for an application or process running on the host system to communicate with one of the fabric devices. Thus, when a fabric device is onlined, a communication path may be established between the host system 508 and the discovered fabric device.

Administration application 502 thus provides a mechanism to select and online only a subset of the visible fabric devices. Also administration application 502 may be run outside of the boot process so that device discovery and online operations do not increase the host system boot time. The administration application 502 may be run on-demand so that fabric devices may be selected and brought online on demand. For one embodiment of the present invention, a system administrator may use administration application 502 to request a list of fabric devices available through one or more host adapter I/O ports of host system 508. Administration application 502 may include a command line interface or a graphical user interface (or both) for displaying the list to the system administrator. Through this interface the system administrator may then select a desired subset of the listed devices and request that the selected devices be brought online.

The fabric driver 504 provides APIs for the administration application 502 to make queries in order to obtain a list of devices connected to one or more host adapter ports. In one embodiment a transport layer of the fabric driver 504 may execute the query irrespective of the interconnect topology of the host adapter ports. For example, the fabric driver may obtain the list of devices connected to a fiber channel switched fabric by querying a fabric name server. The fabric name server may be located within a fabric switch or distributed across the fabric switches and maintains information about the various fabric devices. The fabric name server may include a database of objects. Each fabric attached device may register or query useful information in the name server, including, name, address, class of service capability of other participants, etc. The fabric driver may also provide an API for obtaining a list of direct attach devices for a host. For example, the fabric driver may obtain the loop map for a host system's private loop topology.

For direct attach devices, e.g. private loop topologies, operating system device nodes may be created during driver attach (e.g., when the fabric driver is loaded during a reboot) for all devices visible through a direct attach port. In some embodiments, operating system device nodes are only created for direct attach devices that support a particular protocol (e.g., FCP/SCSI).

For fabric topologies connected to the host system 508, operating system device nodes may not be created until an on-demand request is made by the administration application 502. As discussed above, upon such a request from the administration application 502, the fabric driver 504 provides a list of devices visible through one or more fabric host adapter ports. The fabric driver 504 may obtain the list by accessing a fabric name server. The list of fabric devices may be provided by the administration application 502 to a system administrator, for example, through a graphical user interface. The system administrator may use the administration application 502 to select and online particular devices which are desired to be used by the host system 508. The administrator may also use administration application 502 to offline any devices which are no longer needed. Offlining may be removing access to a storage device form the host operating system by removing the node. The list of devices displayed to the administrator by the administration application 502 may include the information returned about the fabric devices by the fabric name server. The administration application 502 may request the fabric driver 504 to online or offline fabric devices as indicated by a system administrator using the application's user interface. In some embodiments, the administration application 502 may make requests to fabric driver 504 to obtain fabric device information and/or to online/offline fabric devices without the involvement of a system administrator. For example, certain events or requests from other processes may trigger administration application 504 to online a fabric device(s).

The persistent repository 506 may be stored in the host system 508, or in some central local accessible to host system 508, indicating the current fabric devices which have been onlined (e.g., devices for which an operating system device node has been created). The information stored in the persistent repository 506 may be used so that the configuration of devices online for the host system 508 persists across reboots and shutdowns. For example, when the host system 508 is rebooted the persistent repository may be read to determine which devices were online before the reboot and the fabric driver may be requested to online these same devices again.

The persistent repository 506 may be dynamically updated to reflect the state of the fabric devices. For example, if a fabric device which is currently online for the host system 508 is disabled on the fabric (for example, a hard drive fails or is removed from the fabric), fabric driver 504 may generate an event causing the persistent repository to be updated to reflect that the device is now offline. Similarly, if the same device later is restored on the fabric, the device may be onlined again (e.g. in response to an event) for the host system 508 and the persistent repository dynamically updated to reflect the onlined status.

Although fabric 510 may include an extremely large number of fabric devices, the query operations made by administration application 502 to obtain a list of the fabric devices may be made on a per host adapter port granularity or a set of host adapter ports granularity so that the number of devices returned by the query may be a manageable number.

Figure 6:
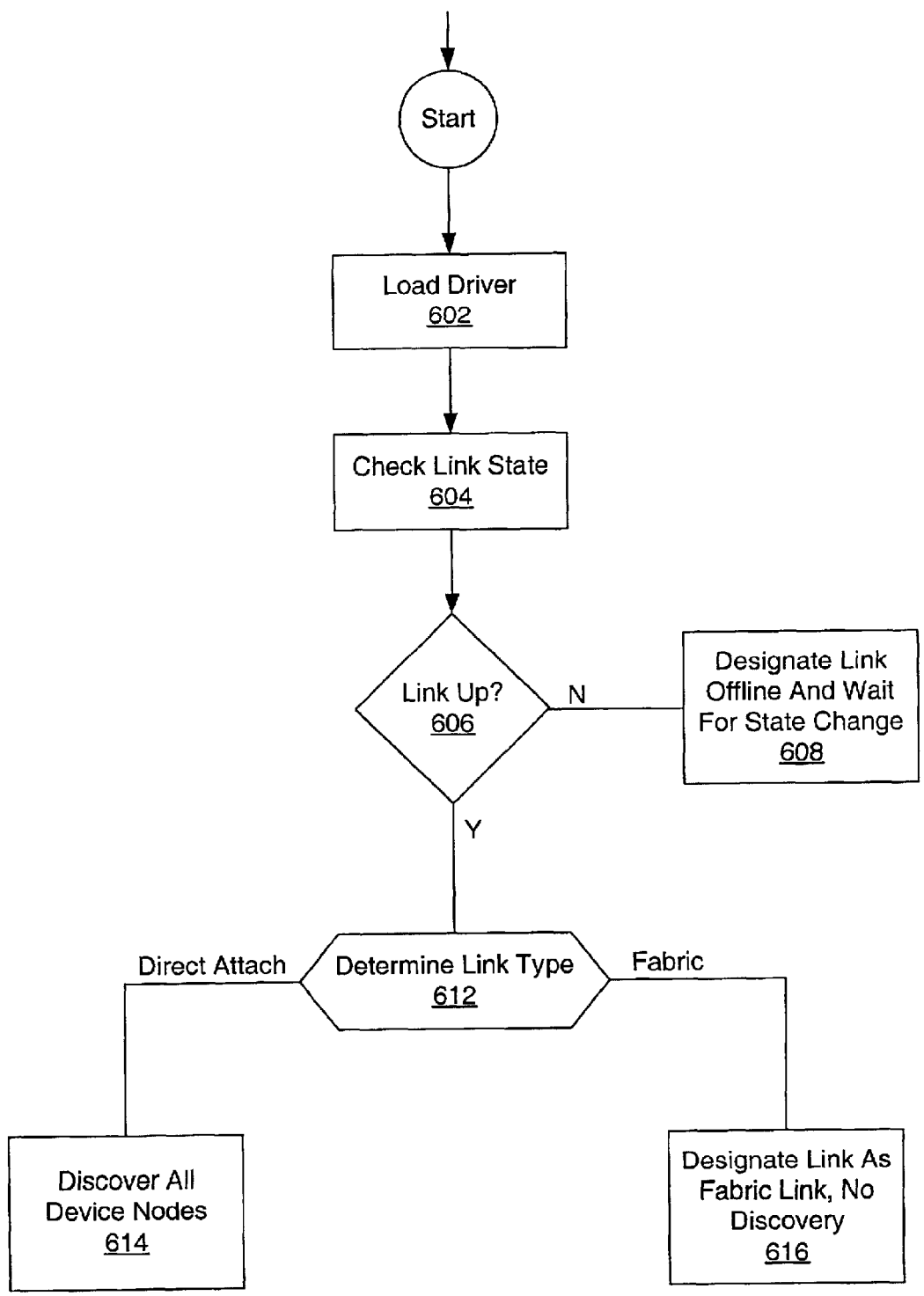
FIG. 6 is a flowchart illustrating a device discovery process, according to one embodiment of the present invention.

Turning now to FIG. 6, a flowchart is provided illustrating a device discovery process according to one embodiment of the present invention. The discovery process may be part of a host system reconfiguration boot process. Alternatively, if a non-reconfiguration boot is performed of the host system in which device discovery is not performed, the discovery process may run when a previously created device node is accessed in the host system. This discovery process may also be performed if the host system's host adapter link is lost (e.g. cable pulled out).

During the discovery process a fabric driver is loaded as indicated at 602. Note that if the fabric driver is already loaded, then it may no be necessary to load the fabric driver again. The link state of each host adapter port may be checked as indicated at 604 and 606. If a port's link is down, the link may be designated as offline as indicated at 608, and the discovery process for that link may wait for a state change in the link to online, as indicated at 610. If the link is later restored, the discovery process may continue for that link.

If the link is up, the link type is determined, as indicated at 612. In one embodiment, a fabric login is attempted through the link. If the fabric login is successful, the link is determined to be a fabric link. If unsuccessful, the link is determined to be a direct attach link. For a direct attach link, the one or more direct attach devices are discovered and brought online by creating operating system device nodes for each direct attach device. If the link is a fabric link, the link is designated as such, but no device discovery or onlining of devices is performed for the fabric link as part of this discovery process, as indicated at 616. The discovery process as illustrated in FIG. 6 may be repeated any time a link goes out (e.g., cable pulled, power off, host reboot, etc.).

The device discovery process illustrated in FIG. 6 provides for the discovery and onlining of direct attach devices since the discovery and onlining of such devices may be completed quickly due to the limited number of such devices. However, for a host system's fabric links, device discovery is not performed as part of the normal discovery process performed at reconfiguration boot up or the first time a node is attempted to be accessed after a link has been down and brought back up. Instead, fabric devices may be discovered using the on-demand node creation process described herein.

Figure 3:
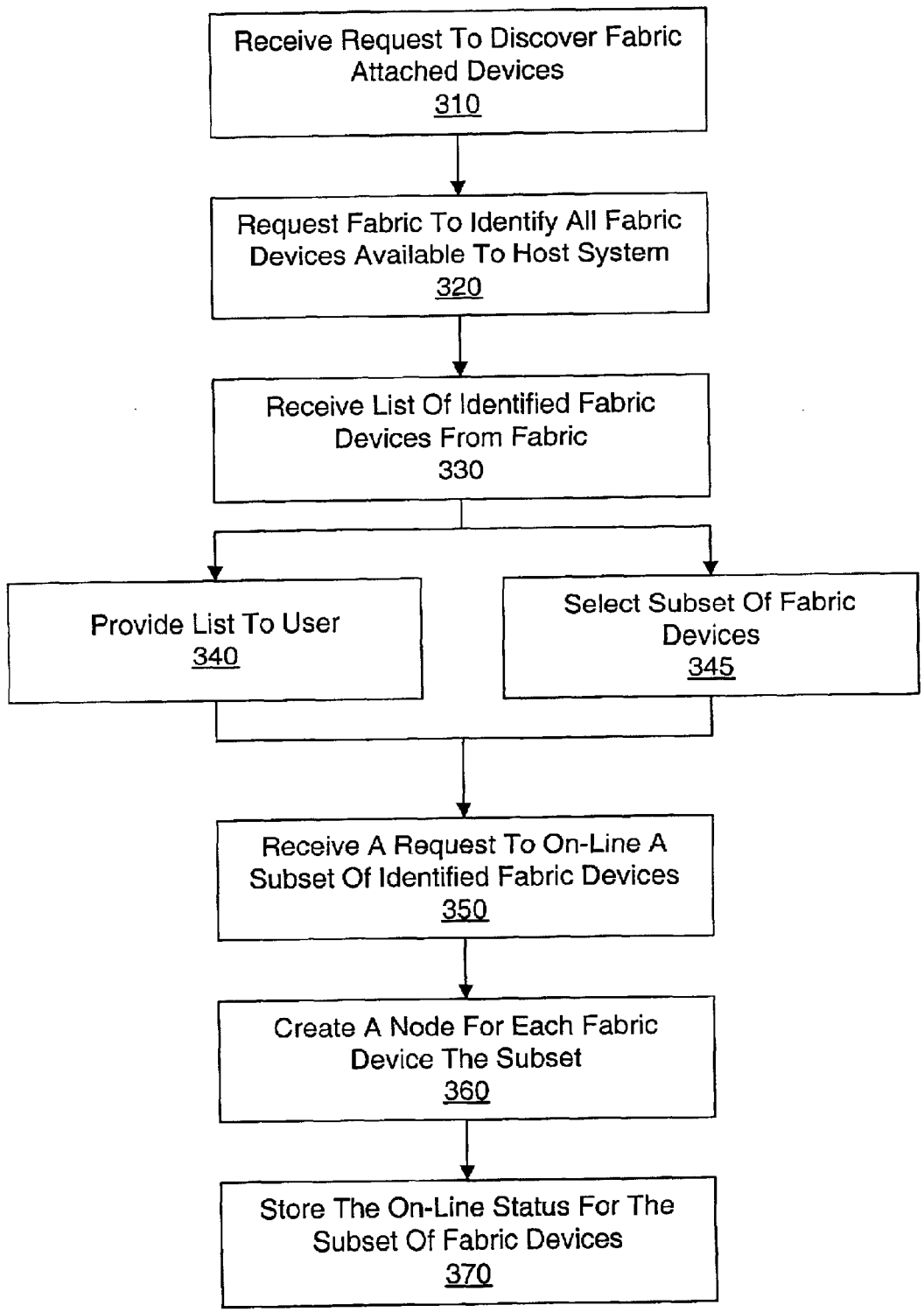
FIG. 3 is a flowchart illustrating an on-demand node creation process according to an embodiment of the present invention.

One embodiment of the on-demand node creation process is illustrated by the flowchart of FIG. 3. A request may be received to discover fabric attached devices, as indicated at 310. In response to the request to discover fabric attached devices, a fabric may be requested to identify fabric devices available to a host system, as indicated at 320. A list of identified fabric devices may be received from the fabric, as indicated at 330. Note that the term "list" simply refers to the information provided by the fabric driver and does not require any particular format.

This list may be provided to a user for selection of a subset of the fabric devices, as indicated at 340. Alternatively, selection of a subset of the fabric devices may be performed without user involvement, as indicated at 345. A request may be received to on-line the subset of identified fabric devices, as indicated at 350. In response to the request to on-line the subset of identified fabric devices, a node may be created for each fabric device of the subset not already on-line, as indicated at 360. The node provides a mechanism for processes to communicate with the corresponding device from the host system. The on-line status on each fabric device of the subset may be stored, as indicated at 370.

Figure 7:
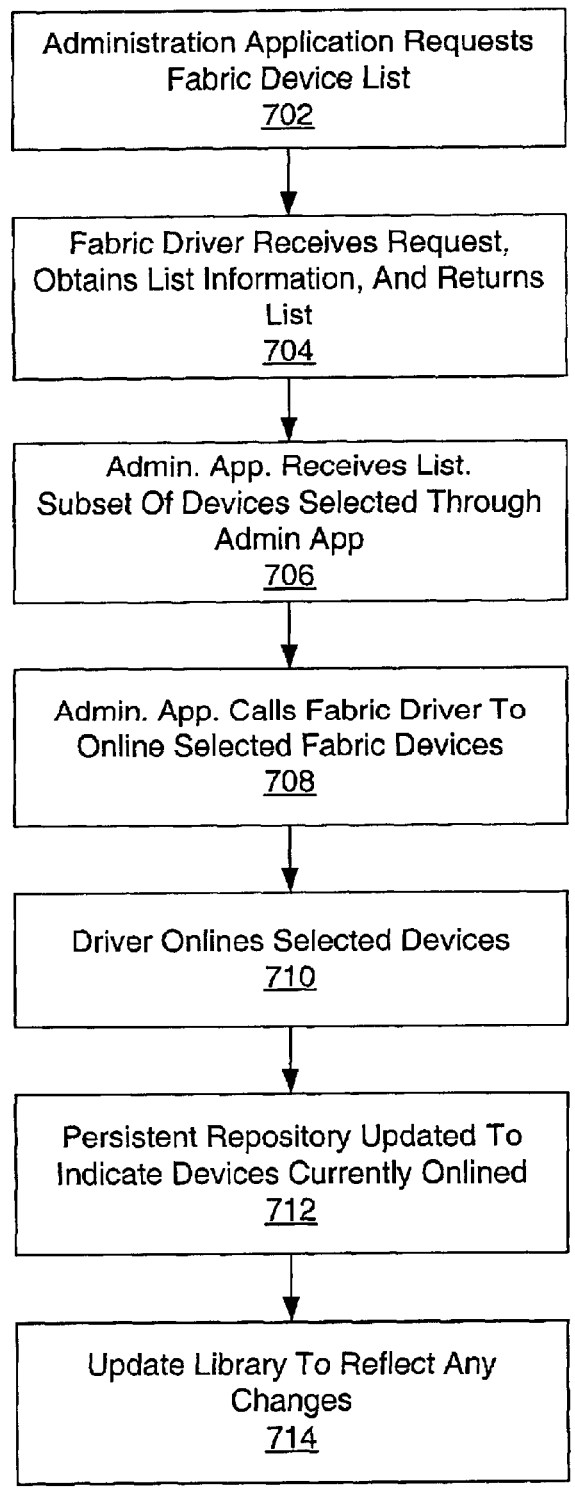
FIG. 7 is a flowchart illustrating an on-demand device node creation process, according to one embodiment of the present invention.

Another embodiment of the on-demand node creation process is illustrated by the flowchart of FIG. 7. An administration application may make a request for a list of fabric devices, as indicated at 702. This request may have been initiated by a system administrator using the administration application for the host system. In other embodiments, this process may be initiated automatically, for example in response to an event (e.g. fiber channel protocol event) or a request from another application or process. A fabric driver may receive the request from the administration application as indicated at 704. The fabric driver may access a fabric name server to obtain the requested information and return the requested list of fabric devices to the administration application. Note that the term "list" simply refers to the information provided by the fabric driver and does not require any particular format.

The administration application may receive the list and a subset of devices may be selected from the list, as indicated at 706. In one embodiment the list may be displayed through a graphical user interface to a system administrator. In other embodiments, a command line or textual user interface is used. The system administrator may select particular devices from the list to be onlined or offlined. The administration application may then call the fabric driver to online or offline devices as indicated by the selections made for the subset of devices from the list, as indicated at 708. The driver may then attempt to online the devices selected to be onlined (and may offline the devices selected to be offlined), as indicated at 710. Onlining a device may include the creation of an operating system device node for that device. The device node provides a mechanism for processes to communicate with the corresponding device from the host system.

A persistent repository may be updated (or created if not already existing) to indicate which devices are currently online, as indicated at 712. During operation, the persistent repository may be updated to reflect any changes in fabric devices. For example, if a device indicated by the persistent repository to be currently onlined is removed from the fabric the persistent repository may be updated accordingly as indicated at 714. Changes in the fabric may be detected by an event generated in the fabric and communicated to the administration application (or library) by the fabric driver.

Figure 8:
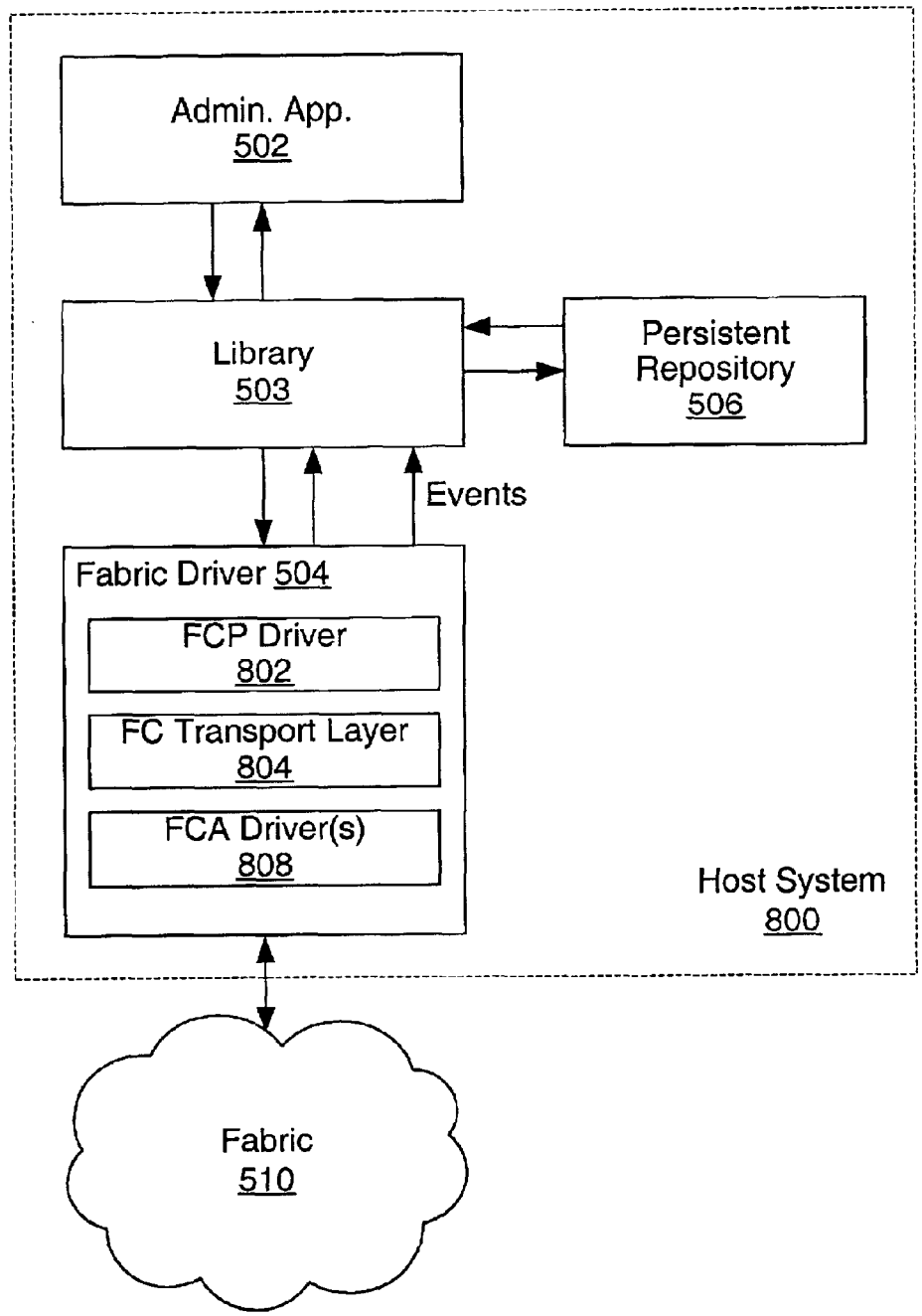
FIG. 8 is an illustration of a system coupled to a fabric according to an embodiment of the present invention.

FIG. 8 illustrates a host system 800 coupled to a fabric 510 according to one embodiment of the present invention. The host system 800 includes a fabric driver 504 for communicating with a fiber channel fabric. A library 503 may be provided as an interface between the administration application 502 and the fabric driver 504. The library may be made part of the operating system libraries and may be usable by other applications on the host system. For one embodiment of the present invention, fabric driver 504 may include various sub-modules. For example, in a fiber channel implementation, the fabric driver may include a fiber channel protocol driver module (FCP) 802. The FCP module may be part of the operating system kernel and may perform all protocol related operations required for fiber channel use on the host operating system. For example, FCP module 802 may be a SCSI over fiber channel encapsulation driver module for supporting SCSI over fiber channel. Driver 504 may also include a transport layer 804. This module may perform all generic fabric operations. In one embodiment transport layer 804 may include a fiber channel port (FP) driver for each fiber channel port on the host system. Each FP driver may also be part of the operating system kernel. The FP driver performs all generic fiber channel operations such as topology discovery (e.g., loop, point-to-point, fabric, etc.), device discovery (on various topologies), handling extended link services, handling link state changes, etc. The fabric driver 504 may also include host adapter drivers 808 for each host adapter/controller board on the host system. For example FCA drivers may be present for fiber channel adapters having fiber channel ports on the host system.

Figure 9:
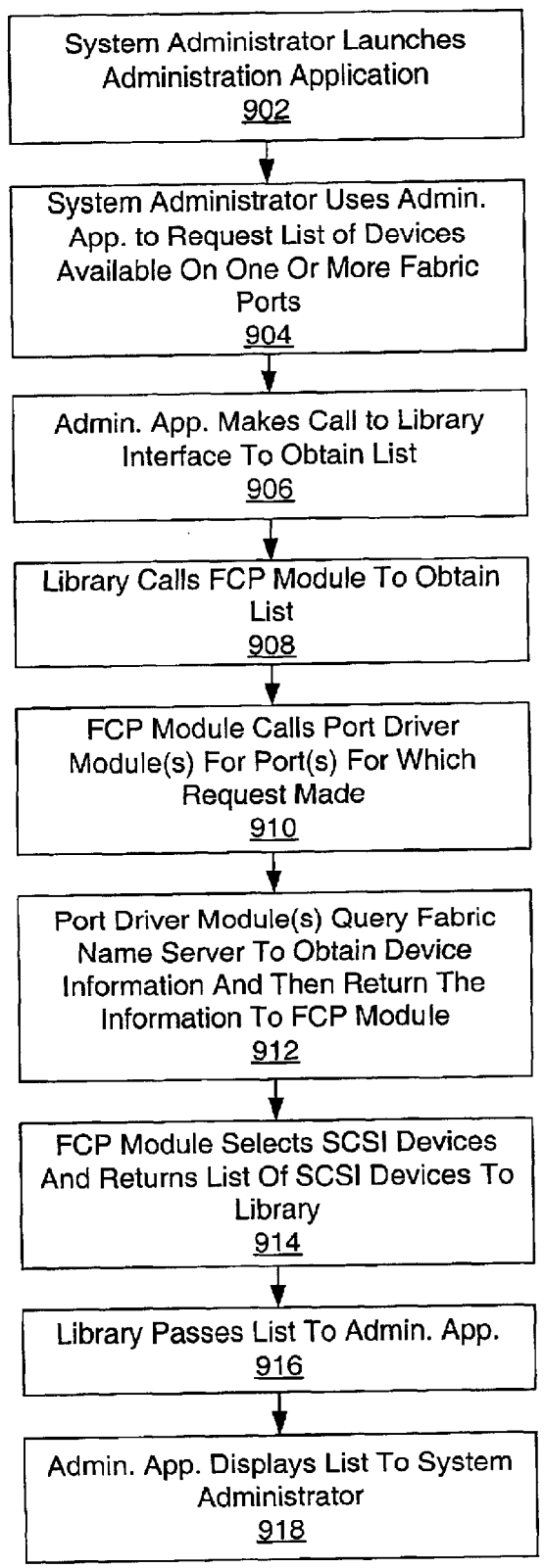
FIG. 9 is a flowchart of an on-demand node creation process for fiber channel fabrics according to an embodiment of the present invention.

FIG. 9 illustrates a more detailed flowchart of the on-demand node creation process for fiber channel host adapter ports of a host system. In one embodiment, the host system may be executing a UNIX type operating system such as the Solaris™ operating system from Sun Microsystems. A Solaris operating system and fiber channel fabric will be assumed by way of example in the following description.

A user (e.g. system administrator, other process, etc.) may launch or access the administration application to obtain a list of devices available on a fabric port (e.g. FCA port), as indicated at 902. For example, a system administrator may interface to the administration through a graphical user interface (GUI), command line use interface, etc. Through the user interface, the system administrator may query for devices available on a single port or on a set of ports, as indicated at 904. On Solaris, for example, an FCA port may have a file system representation of the form, e.g., /devices/pci@1f,0/pci@1/SUNW,qlc@4/fp@0,0:fc.

One or more library interfaces may be provided as an interface between the administration application and the fabric driver. This library interface(s) may be made part of the operating system's standard storage libraries. The administration application may then call one or more of the library interfaces to obtain the list of devices, as indicated at 906. These libraries may be shared between the administration application and other storage applications. The library calls into the fabric driver to obtain the list of devices, as indicated at 908.

In one embodiment, the library calls into an FCP module using the standard driver IOCTL interface (the call may actually be made into an FP module which merely passes on the IOCTL call to the FCP module) to obtain the list of devices. The library may then wait for the FCP module to return the list. The FCP module may then make a call into a port driver module(s) to obtain the list of fabric devices available through the fabric port(s) on which the request was made, as indicated at 910. For example, the FCP module may call an FP module(s) using the FC transport APIs between ULPs and the FC transport to obtain the list of fabric devices available through the FCA port(s) on which the request was made.

The fabric driver (e.g. port driver module(s) of the fabric driver) then obtains the device information from the fabric. In one embodiment, the FP module(s) may query a NameServer on the fabric (the Name Server may be maintained by FC switches) to obtain the list of FC ports and return this list to FCP, as indicated at 912.

In one embodiment, the fabric driver may check the list for devices following a particular protocol and return a list of those devices to the administration application library interface. For example, the FCP module may check for SCSI ports from the received list (e.g. disks and tapes) and return the list of SCSI capable FC ports to the library, as indicated at 914. In another embodiment, the list may include selective LUNs (logical units) behind an FC port. The library may then pass this list on to the administration application, as indicated at 916. The administration application may then display the list through its user interface, as indicated at 918.

Figure 10:
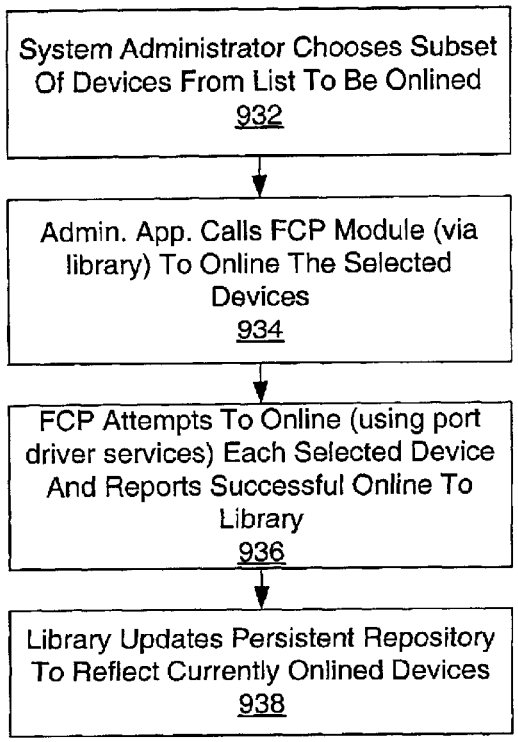
FIG. 10 is a flow chart illustrating a method for onlining selected fabric devices on-demand from a list of fabric devices, according to one embodiment of the present invention.

Turning now to FIG. 10, a flow chart is provided illustrating a method for onlining selected fabric devices on-demand from a list of fabric devices, according to one embodiment. In one embodiment, a list of fabric devices may have been obtained by the method illustrated in FIG. 9. A user (e.g. system administrator, other process, etc.) chooses a subset of devices from this list to online and passes this list of devices to the administration application, as indicated at 932. The administration application may then call the fabric driver to online the selected devices. For example, the administration application may call an FCP module (via a library interface) to online the selected devices, as indicated at 934. The FCP module, using the services of FP module(s), attempts to online each of the selected devices in the list and reports each successful online to the library, as indicated at 936. For every device successfully onlined by the FCP module, the administration application library interface updates a persistent repository to reflect devices currently onlined, as indicated at 938. Note also that offlining a node through the administration application may cause an event to be generated to trigger an update the persistent repository.

Figure 11:
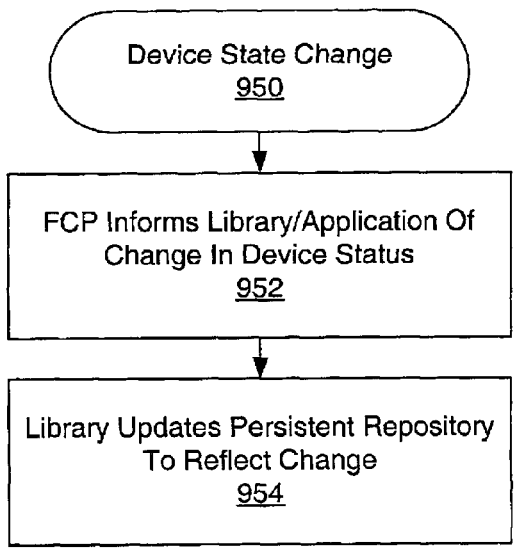
FIG. 11 is a flowchart illustrating a mechanism for dynamically updating a persistent repository to reflect a changes a in the fabric, according to one embodiment of the present invention.

Turning now to FIG. 11, one embodiment is illustrated of a mechanism for dynamically updating the persistent repository to reflect changes that occur in the fabric. A device state change may occur in the fabric, as indicated at 950. For example, a fabric disk drive online for the host system may be removed from the fabric. An event may be generated to indicate this change. The FCP module may inform the library/application of such changes that effect the device list, as indicated at 952. The administration application library interface may update the contents of the persistent repository in response to receiving notification of a change, as indicated at 954, so that the persistent repository is dynamically updated to reflect such changes. The persistent repository may be stored, for example, on persistent storage such as a disk drive or non-volatile memory.

Figure 12:
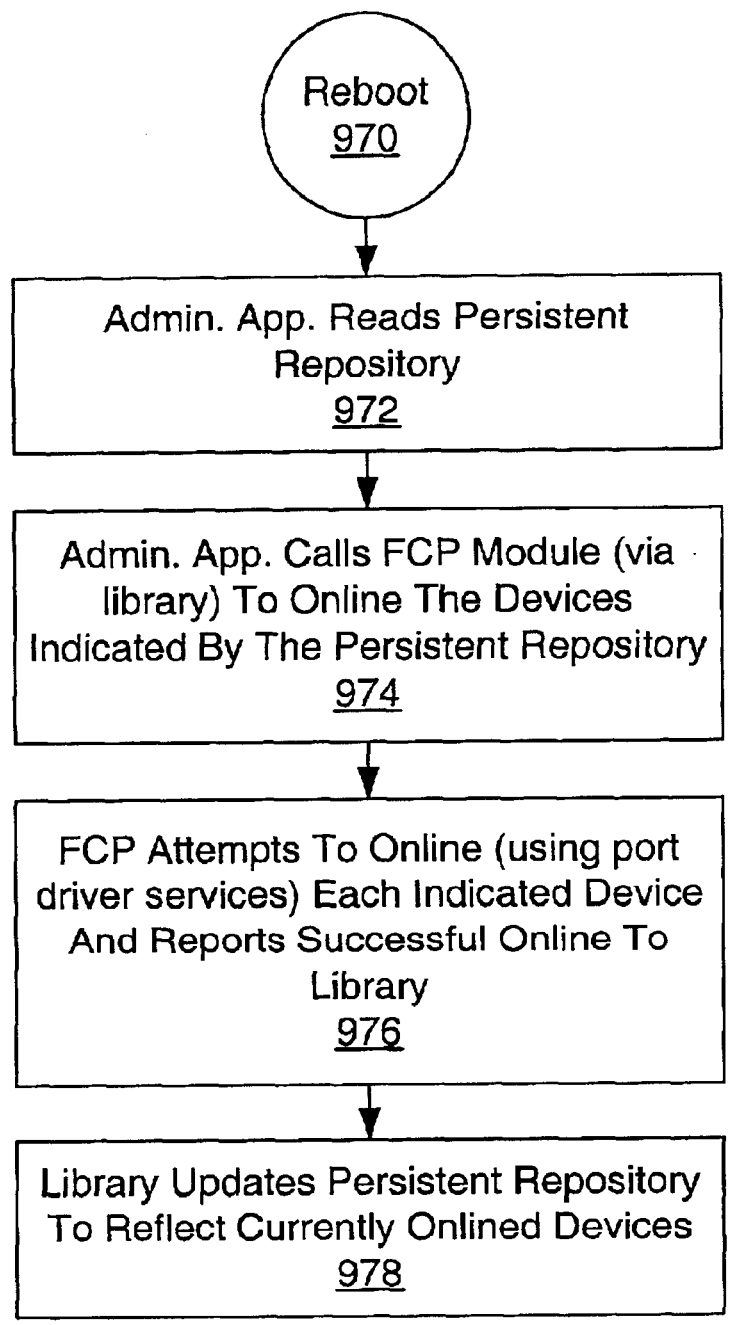
FIG. 12 is a flowchart illustrating a mechanism to allow a host's fabric device configuration to persist across reboots and shutdowns, according to one embodiment of the present invention.

The persistent repository may allow a host's fabric device configuration to persist across reboots and shutdowns, as illustrated in FIG. 12 for one embodiment. On a host reboot (970), a component of administration application (e.g. in the Solaris 'rc' scripts) reads the persistent repository to determine which devices were previously online, as indicated at 972. The administration application then calls the fabric driver (via the library) to online the fabric devices that were onlined prior to the reboot, as indicated at 974. The fabric driver attempts to online each device indicated by the persistent repository and reports successful onlines to the library, as indicated at 976. The library may then update the persistent repository to reflect the currently online devices, as indicated at 978.

An example of an entry in a persistent repository is: /devices/pci@1f,4000/pci@(2/SUNW,qlc@4/fp@0, 0:fc::50020f23000000e6. In this example, the entry identifies the devices path to an onlined FC port. In other embodiments, additional information may be included. For example, the repository may identify onlined fabric devices on a per LUN basis.

As discussed above, fabric devices may be efficiently configured for access through a host adapter port on a host computer by using an on-demand node creation process. Also, a persistent repository may store an indication of fabric devices that are online through each host adapter port. The persistent repository may be used to maintain the node configurations for each host adapter port across reboots and shutdowns. Thus, fabric devices may initially be configured, for example, through an administration application which initiates node configuration requests for selected fabric devices. If the host system is rebooted, the previous fabric device node configurations may be restored by accessing the persistent repository to determine the previously onlined fabric devices and bringing those devices online again.

In some embodiments, various users or applications on a host system may desire different configurations of fabric devices to be used from the host system. Some applications or processes running on a host system may only need to access certain fabric devices for a specific amount of time or at certain times. During other times the same fabric devices may not need to be accessed by the application or process. In some embodiments, an application may need to configure certain fabric devices for exclusive access for a particular period of time and may then no longer require access or may allow shared access to the fabric device(s).

One example of an application that may require access to fabric devices for only a limited amount of time is a storage backup process. At certain time periods a storage backup process may be executed to backup the data stored on one or more fabric storage devices. For example, a backup process may be scheduled to run daily at 2 a.m. The storage backup process may run on the same or a different host system than a file server process which has configured the fabric storage devices for storage access. When the storage backup process is ready to begin a backup procedure, it may need to configure both the fabric storage devices that are to be backed up and one or more fabric backup storage devices, such as a tape or optical storage device. Once the storage backup process has completed the backup operation it may no longer need access to these fabric devices until time for the next backup operation.

Thus, it may be desirable to have an interface which allows different users or different applications on a host system to create different fabric device configurations for use from the host system. A standard interface may be provided for creating and maintaining various different fabric device configurations for a host system. The standard interface may allow for the creation of user specific or application specific fabric device configurations.

Figure 13:
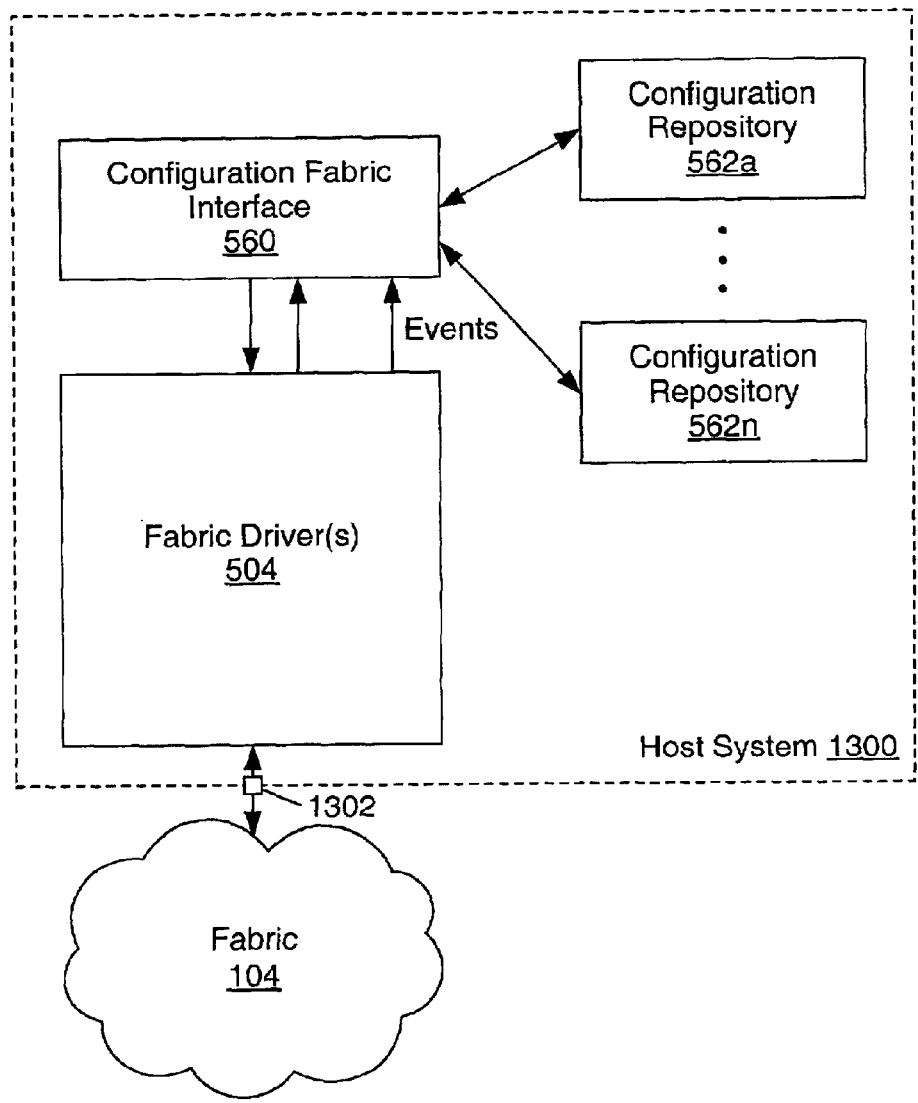
FIG. 13 is an illustration of a system including a standard fabric configuration interface for creating and maintaining various different fabric device configurations on a host system, according to one embodiment of the present invention.

Turning now to FIG. 13 a standard fabric configuration interface 560 may be provided for creating and maintaining various different fabric device configurations on a host system 1300. The host system 1300 may have one or more ports 1302 for coupling to a fabric. The fabric configuration interface 560 may provide an interface through which an application may request a list of fabric devices accessible to host system 1300 or accessible on a particular port 1302. In response to a request for a list of fabric devices, the interface may query fabric driver 504 which may obtain the list from a name server for fabric 104. The fabric configuration interface 560 provides the fabric device list to the requesting application. The fabric configuration interface may support various user interfaces such as a command line or graphical user interface for requesting and viewing the fabric device list. The fabric configuration interface 560 may provide an interface for an application to specify an existing fabric device configuration to be modified. For example, fabric configuration interface 560 may store a representation of each different fabric device configuration as a configuration repository 562. Thus, multiple different configuration repositories (e.g. 562a–n) may exist, each one representing a different fabric device configuration. The fabric configuration interface 560 may allow an application to create and modify different configuration repositories 562.

Fabric configuration interface 560 provides an interface for an application to select or deselect fabric devices for host configuration. As described above, host configuration may include the creation of an operating system node representing a particular fabric device and which provides a mechanism for an application to communicate with that particular fabric device. The fabric configuration interface 560 may store information indicating the fabric device configuration as selected by an application into a configuration repository 562. Multiple different versions of a configuration repository 562 may be created and maintained through this process.

Fabric configuration interface 560 also provides an interface for verifying particular configurations as indicated by a configuration repository 562. The verification operation may include requests through fabric driver 504 to verify that selected fabric devices are still available on fabric 104. Fabric configuration interface 560 may perform this verification operation before requesting configuration of (e.g. node creation for) fabric devices selected from an existing configuration repository 562.

The fabric configuration interface 560 may be part of library 503 as described with FIG. 8. The fabric configuration interface 560 provides an interface through which a particular fabric device configuration may be applied based on the need of a particular application or host operation. For example, an application may need certain fabric devices to be configured in order to perform a particular task. Thus, fabric configuration interface 560 provides a mechanism for a user or application on a host system to create multiple different fabric device configurations. Each different fabric device configuration may be represented in a different configuration repository 562. In one embodiment, the configuration repositories 562 may be stored in the non-volatile memory, such as on a disk drive. In another embodiment, the configuration repositories 562 may be stored in other memory such as the host's system memory (e.g. volatile RAM). In one embodiment, one of the configuration repositories 562 may be a default configuration repository which may indicate the initial fabric device configuration for the host upon reboot.

Figure 13A:
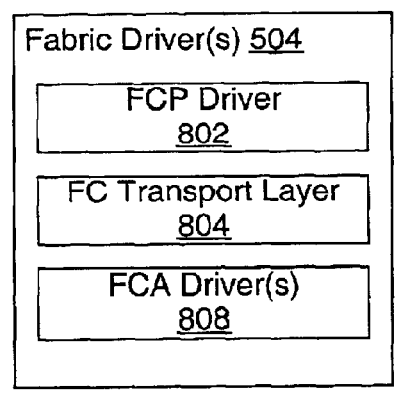
FIG. 13A is an illustration of modules which may be included in a fabric driver according to one embodiment of the present invention.

For one embodiment of the present invention, fabric driver 504 may include various sub-modules as illustrated in FIG. 13A. For example, in a fiber channel implementation, the fabric driver may include a fiber channel protocol driver module (FCP) 802. The FCP module may be part of the operating system kernel and may perform all protocol related operations required for fiber channel use on the host operating system. For example, FCP module 802 may be a SCSI over fiber channel encapsulation driver module for supporting SCSI over fiber channel. Driver 504 may also include a transport layer 804. This module may perform all generic fabric operations. In one embodiment transport layer 804 may include a fiber channel port (FP) driver for each fiber channel port on the host system. Each FP driver may also be part of the operating system kernel. The FP driver performs all generic fiber channel operations such as topology discovery (e.g., loop, point-to-point, fabric, etc.), device discovery (on various topologies), handling extended link services, handling link state changes, etc. The fabric driver 504 may also include host adapter drivers 808 for each host adapter/controller board on the host system. For example FCA drivers may be present for fiber channel adapters having fiber channel ports on the host system.

Figure 14:
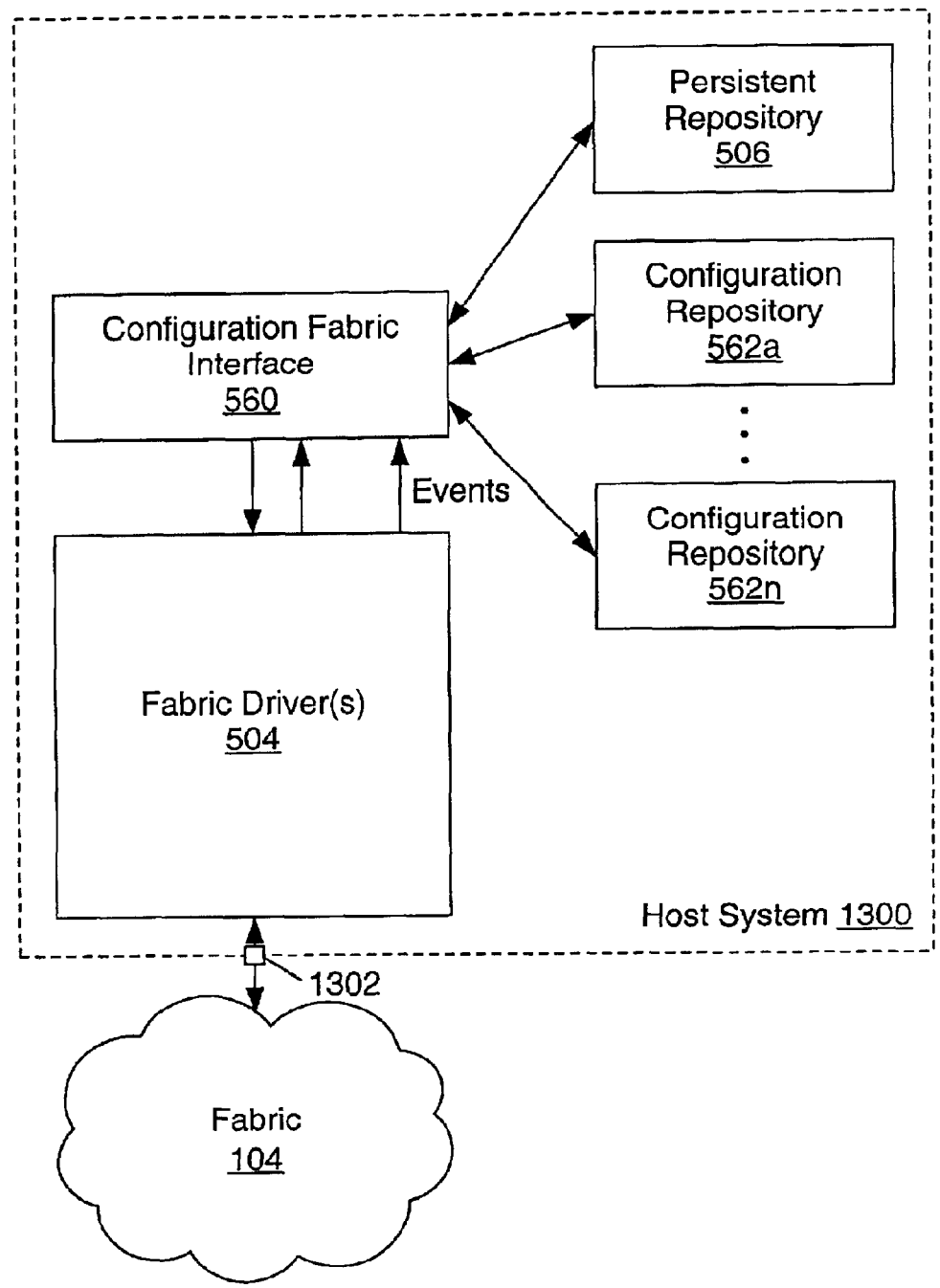
FIG. 14 is an illustration of a system including a standard fabric configuration interface for creating and maintaining various different fabric device configurations, including a default configuration, on a host system, according to one embodiment of the present invention.

Turning now to FIG. 14, a persistent repository 506 such as described above with FIGS. 5 and 8, may be stored in addition to various configuration repositories 562. The persistent repository may indicate a main, or default, configuration for the host system. The configuration indicated by the persistent repository 506 may be the configuration that is restored upon a reboot. For example, upon a configuration reboot, the persistent repository 506 may be read and the fabric devices indicated to be configured by the default configuration repository may be verified and then configured (e.g. node created for each device). Fabric configuration interface 560 may also be used to create or modify specific configuration repositories 562 for specific purposes. It may be inefficient for a user or application to open, search, and modify a single large global configuration repository to create specific fabric device configuration. Having an interface to modify or create different configuration repositories may provide a more efficient fabric device configuration mechanism for many applications.

Figure 15:
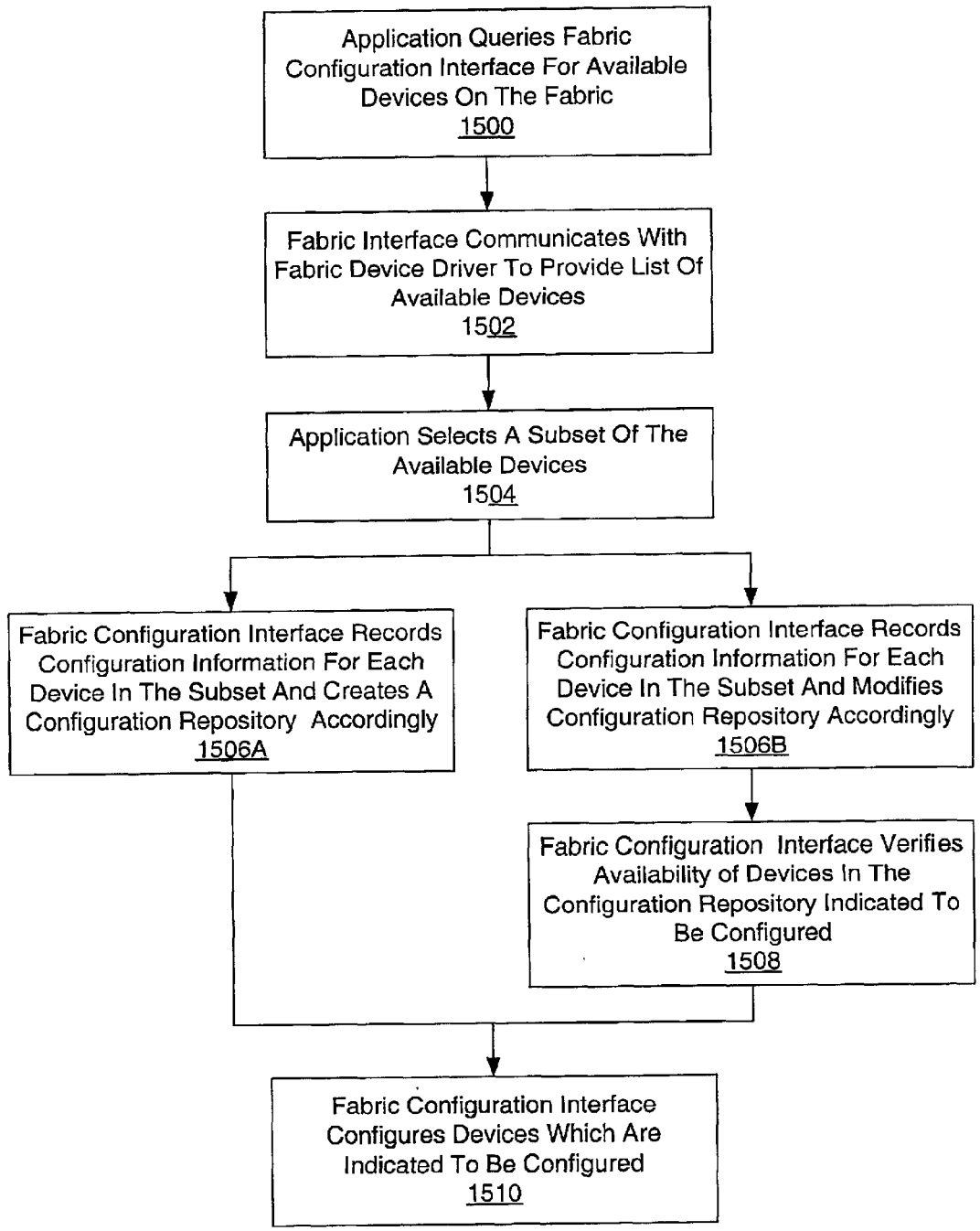
FIG. 15 a flowchart illustrating a method according to one embodiment of the present invention in which an application may use a fabric configuration interface to modify or create a specific fabric device configuration.

Turning now to FIG. 15 a flowchart is provided illustrating a method according to one embodiment in which an application may use the fabric configuration interface 560 to modify or create a specific fabric device configuration. For example, an application may need certain fabric devices to be configured in order to perform a particular task. FIG. 15 illustrates a flowchart of a fabric device management process, according to one embodiment. An application may desire to manage or utilize a subset of the attached devices on the fabric. The process described below may provide a method whereby the application may select and utilize such a subset of devices from a list of available devices on the fabric.

As FIG. 15 shows, in 1500, the application may query the fabric configuration interface for available devices on the fabric. The available devices on the fabric may include both configured and un-configured devices which are attached to the fabric. In one embodiment, the application may query the fabric interface for available devices on a particular port. In another embodiment, the application may query the fabric interface for all available devices of a particular type, such as all available hard drives. As indicated in 1502, the fabric configuration interface may communicate with a fabric driver to request a list of the available devices to the application. The fabric device driver may query the fabric (e.g. fabric name server) to generate the list of available devices and return the list to the fabric configuration interface.

In 1504, the application may select a subset of the available devices from the list. Such a subset may be desired because the application may only have need for the services of a small number of devices. Configuration information may be indicated for each available device. The configuration information for a device may include one or more of a device name, the current configuration status of the device, or any other device-related information which may be useful to the application. In one embodiment, the device name may include a particular port designation associated with the device, concatenated with a world-wide name for the device, as used by the fabric to denote the device. The fabric configuration interface may also provide for the application to set a desired configuration status for the device. The application may set a field in the configuration information for each selected device to indicate the desired configuration status for that device. Then, in response to the application's selection, the fabric interface may request node creation for the selected devices and may record the configuration information for each of the selected devices in a configuration repository.

In one embodiment, the application may instruct the fabric configuration interface to create a new configuration repository, as indicated in 1506A. Alternatively, the fabric interface may update or modify an existing configuration repository, as indicated in 1506B. For example, an application may select one or more fabric devices from the list of available fabric devices to be added to an existing configuration repository's list of devices to be configured. Thus, a configuration repository may specify a subset of available fabric devices. The application may thus access configuration information for each of the devices in the subset of devices which was selected by the application. Note that in one embodiment, the configuration repository may be associated with a particular application, in that the subset of devices in that repository has been selected by that application. For example, in the case mentioned above wherein the application is a backup utility program, the application may be responsible for periodically copying data from the host computer system to one or more particular tape drives or optical drives. The application may therefore create a configuration repository for only on those devices which are involved in the backup process.

The fabric configuration interface may configure each device whose desired configuration status indicates that the device should be configured, as indicated at 1510. The fabric configuration interface may allow a the desired configuration status to be specified by a user or application. In some embodiments, the desired configuration status may also be stored in the configuration repository. In one embodiment, the fabric configuration interface may pass the newly created or modified configuration repository to a fabric driver. The fabric driver may initiate or perform the node creation process for the fabric devices whose configuration status indicates that configuration is desired. If the configuration repository is a modified or updated existing configuration repository, entries for some of the fabric devices marked for configuration may have been created prior to the current configuration process. Thus, the fabric configuration interface may request that the fabric devices indicated to be configured are first verified to ensure they are still available on the fabric, as indicated at 1508. A verification request may be made to the fabric driver which may verify each device to be configured with the fabric name server. If the configuration repository is newly created from a fabric device list just obtained from the fabric, verification may not be needed. The fabric configuration interface may then request that each fabric device marked for configuration be configured, as indicated at 1510. As mentioned above, a device may be configured by the host creating a network node corresponding to the device, wherein the node functions as an internal representation of the device on the host's network.

Note that the flow charts described herein do not necessary require a temporal order. For example, the fabric interface may record configuration information (1506) before, after or during verification of availability of devices (1508). As a further example, configuration of devices (1510) may be performed before the configuration files is updated or stored (1506).

Figure 16:
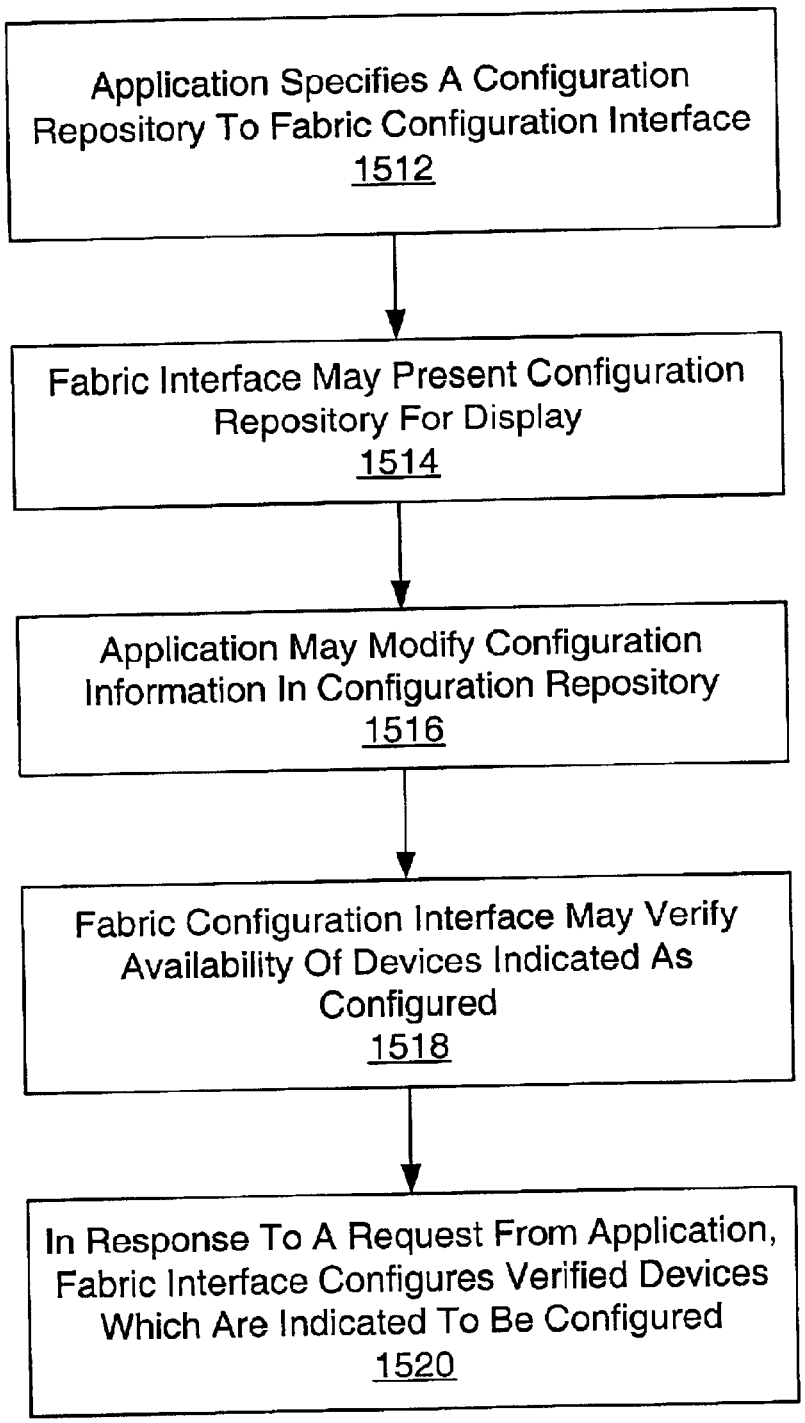
FIG. 16 a flowchart illustrating a method according to an embodiment of the present invention in which an application may use a fabric configuration interface to modify or create a specific fabric device configuration.

FIG. 15 illustrates an embodiment in which an application or user requests the fabric configuration interface to provide a list of currently available fabric devices. The list is obtained from the fabric driver and fabric name server. Thus, the embodiment described for FIG. 15 uses this fabric device list as the source of information from which to select devices for configuration. Additionally or alternatively, an application or user may use information from an existing configuration repository as the source of information from which to select devices for configuration (or unconfiguration). FIG. 16 is a flowchart of such an aspect of the fabric device management process, according to one embodiment. As FIG. 16 shows, in 1512 the application may indicate a particular configuration repository to the fabric interface. The application or user may desire to alter or add to the configuration indicated by the configuration repository, or the application may want to verify the indicated configuration. In this way the application may utilize the same configuration file from session to session without danger of trying to access a device that is no longer configured or accessible on the fabric.

In one embodiment, the fabric interface may provide the contents of the configuration repository to an application, as indicated in 1514. In some embodiments, the configuration repository may be displayed to a user. In 1516 the application (or a user through an application) may modify the configuration information in the configuration repository, for example, by changing adding or deleting entries. Also, the application (or a user through an application) may specify the desired configuration status for each selected device.

In response to a verification request from the application, in 1518 the fabric configuration interface may verify the availability of each selected device, by querying the fabric device driver regarding the availability and/or actual configuration status of each device. In the event that a device is determined to be unavailable, i.e., there is a verification error, the application may cancel the process and may execute the process described with reference to FIG. 15 to add new devices to the configuration file, if necessary. Alternately, in the event of a verification error the application (or user) may determine that the available resources are sufficient and continue the process.

Finally, in 1520, in response to a configuration request from the application, the fabric configuration interface may request configuration (via the fabric driver) of each device whose availability has been verified and whose desired configuration status indicates that the device is to be configured.

In one embodiment, the application may request that the fabric interface un-configure at least one device. In response to the un-configure request, the fabric configuration interface may request the fabric device driver to un-configure the device and report the results to the application.

In another embodiment, the application may be operable to de-select a device from the configuration file, in which case the configuration information of the de-selected device may be removed from the configuration file by the fabric interface. In one embodiment, no configuration action is taken for devices not listed in the submitted configuration repository.

One example of a format in which device configuration information may be presented to an application or user by the fabric configuration interface is as follows. In various embodiments, some or all of this information may be stored in a configuration repository.

| Port WWN | Device Type | Capacity | Configure | Comments |
|---|---|---|---|---|
| Fabric FCA port: /dev/fc/fp0 | | | | |
| 22000020370498af | disk device | 9 G | y | PGR Read Only |
| 220000020370499e1 | disk device | 18 G | | |
| 508002000000000b3 | enclosure device | | | |
| 220000020370497a7 | disk device | 9 G | y | |
| 2200002037049e60 | disk device | 18 G | | |
| Fabric FCA port: /dev/fc/fp1 | | | | |
| 22000020370498ff | disk device | 9 G | y | PGR Read Only |
| 220000020370499d1 | disk device | 18 G | | |
| 228002000000000a3 | disk device | 18 G | | |
| 2200002037049797 | disk device | 9 G | y | |
| ... | | | | |
| ... | | | | |

The Configuration field may be modifiable by the user or application and indicates whether the device is to be configured or not. As discussed above, depending on the user's or application's needs, the source of the device list may be a current fabric device list obtained from a fabric driver or may be from an existing configuration repository. The user or application may specify the source of the device list. For a current fabric device list, the fabric configuration interface may query one or more fabric host ports and get the list from the fabric name server. For example, a user or application may chose this source to get an initial list of fabric devices or a current list in order to create a new or modify an existing configuration.

A user or application may specify a previously saved configuration repository as the source in order to update, modify, and/or verify that existing configuration. As discussed above, if a configuration is updated or modified from a previously generated configuration repository, the fabric configuration interface may provide for verifying the updated or modified configuration repository before attempting to configure or unconfigure the fabric devices. The accessibility on the fabric of each device with the Configuration field set may be checked. Also, devices indicated to be unconfigured (e.g. Configure field not set) may be checked to determine if they are currently configured for use by another application or process, such as a device mounted for a file system process. A warning may be generated if a device marked to be unconfigured is configured for use by another process or application. In general, detailed information from the result of this verification process may be reported back to the user or application.

Once a submitted configuration repository is verified (or if no verification is desired), the devices may be configured as indicated. A node creation operation may be performed for each device with the Configure field set and a node deletion operation for each device with the Configure field not set. The node creation/deletion operation may be combined with the verification operation to reduce the chance of any intervening fabric state changes.

An application may need to work with more than one subset of devices on the fabric, in which case the fabric configuration interface may provide for maintaining additional configuration repositories such that each additional configuration repository corresponds to a different subset of devices used by the application. The fabric configuration interface may provide for configuring different sets of fabric devices for one or more different applications while a host is up and running.

The fabric configuration interface may create additional configuration repositories to store configuration information related to selected subsets of available devices on the fabric for additional applications residing on the host computer system. For example, each additional application may have one or more configuration repositories to store configuration information of a corresponding one or more subsets of fabric devices. The configuration repositories for each additional application may be created and managed according to the processes described above with reference to FIGS. 15 and 16. Specifically, each of the additional applications may specify an existing configuration repository and/or query the fabric configuration interface for available devices on the fabric, the fabric interface may communicate with the fabric device driver to provide a list of available devices to each additional application in response to said querying, each of the additional applications may select respective subsets of the available devices and indicate a desired configuration status and name for each device, and the fabric interface may record the configuration information for each of the devices in the respective subsets of available devices in one or more additional configuration repositories. Each additional configuration repository may thus correspond to one of the respective subsets, and each additional configuration repository may correspond to one of the additional applications. In various embodiments, each configuration file may be stored in a location specified by the corresponding application, or in a central storage on the host computer.

Various modifications and changes may be made as would be obvious to a person skilled in the art having the benefit of this disclosure. Note also that the flow charts described herein do not necessary require a temporal order. It is intended that the following claims be interpreted to embrace all such modifications and changes and, accordingly, the specifications and drawings are to be regarded in an illustrative rather than a restrictive sense.

Various embodiments may further include receiving, sending or storing instructions and/or data implemented in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

What is claimed is:

1. A method for managing accessibility of fabric devices from a host system, comprising:
   storing a plurality of configuration repositories, wherein each one of said plurality of configuration repositories identifies one or more fabric devices;
   receiving a request to online fabric devices according to a specified one of said plurality of configuration repositories;
   accessing the specified configuration repository; and
   requesting a configuration operation to online, for the host system, one or more of the fabric devices identified in the specified configuration repository;
   wherein to online one or more of the fabric devices comprises:
      creating, for each fabric device to be onlined, a reference within the host system's operating system for processes in the host system to communicate with the fabric device.

2. The method as recited in claim 1, wherein said requesting a configuration operation comprises requesting a fabric driver to create an operating system node for each identified fabric device not already online and requested to be brought online.

3. The method as recited in claim 1, wherein said requesting a configuration operation comprises:
   indicating a desired configuration status for each fabric device identified in the specified configuration repository;
   requesting a fabric driver to create an operating system node for each identified fabric device not already online whose desired configuration status is configure; and
   requesting a fabric driver to deactivate or delete an operating system node for each identified fabric device whose desired configuration status is unconfigure.

4. The method as recited in claim 3, further comprising, in response to said requesting a fabric driver to deactivate or delete an operating system node:
   receiving a warning that one of the identified fabric devices whose desired configuration status is unconfigure is in-use for the host system; and
   in response to said receiving a warning, canceling deactivation or deletion of the operating system node for the in-use fabric device.

5. The method as recited in claim 1, wherein said requesting a configuration operation comprises requesting a fabric driver to verify the availability of each identified fabric device on the fabric.

6. The method as recited in claim 1, further comprising creating one of said configuration repositories by:
   receiving a request for a list of fabric devices available to a host system;
   providing said list in response to the request;
   receiving an indication of selected fabric devices from said list; and creating one of said plurality of configuration repositories for identifying the selected fabric devices.

7. The method as recited in claim 6, wherein said creating one of said configuration repositories further comprises requesting a configuration operation to configure for the host system the selected fabric devices from said list according to their indicated desired configuration status.

8. The method as recited in claim 6, wherein said providing said list comprises obtaining said list from a fabric driver.

9. The method as recited in claim 6, wherein said providing said list comprises displaying said list to a user.

10. The method as recited in claim 1, further comprising modifying one of said configuration repositories by:
providing entries from a specified one of said configuration repositories;
receiving a request to delete an entry for one of the fabric devices identified in the specified configuration repository; and
in response to said request to delete, updating the specified one of said configuration repositories to delete said entry.

11. The method as recited in claim 1, further comprising modifying one of said configuration repositories by:
providing entries from a specified one of said configuration repositories;
receiving a request to change the desired configuration status for one of the fabric devices identified in the specified configuration repository; and
in response to said request to change the desired configuration status, updating the specified one of said configuration repositories to indicate the requested change to the desired configuration status.

12. The method as recited in claim 11, wherein said modifying one of said configuration repositories further comprises requesting a fabric driver to verify the availability on the fabric of each fabric device identified in the modified configuration repository.

13. The method as recited in claim 11, wherein said modifying one of said configuration repositories further comprises requesting a fabric driver to create an operating system node for each fabric device not already online whose desired configuration status is configure.

14. The method as recited in claim 1, further comprising modifying one of said configuration repositories by:
providing a list of fabric devices available to the host system;
receiving an indication of one or more selected fabric devices from said list with desired configuration status for each selected fabric device to be added to a specified one of said configuration repositories; and
updating the specified one of said configuration repositories to add entries for each selected fabric device.

15. The method as recited in claim 14, wherein said modifying one of said configuration repositories further comprises requesting a fabric driver to verify the availability on the fabric of each fabric device identified in the modified configuration repository prior to said updating.

16. The method as recited in claim 14, wherein said modifying one of said configuration repositories further comprises requesting a fabric driver to create an operating system node for each fabric device not already online whose desired configuration status is to be configured for the modified configuration repository.

17. The method as recited in claim 1, wherein one of said plurality of configuration repositories is a persistent repository indicating a default fabric device configuration for the host system.

18. The method as recited in claim 17, further comprising, in response to a reboot of the host system, reading said persistent repository and requesting a configuration operation to configure for the host system the fabric devices identified in the persistent repository according to said default fabric device configuration.

19. A host system, comprising:
one or more ports for coupling to a fabric;
a fabric driver configured to interface the host system to the fabric;
a fabric configuration interface configured to manage a plurality of different
configuration repositories, wherein each one of said configuration repositories indicates a specific fabric device configuration for the host system;
wherein said fabric configuration interface is configured to provide a standard interface for creating said configuration repositories; and
wherein said fabric configuration interface is configured to provide a standard interface for requesting a configuration operation to online one or more the fabric devices according to a specified one of said configuration repositories;
wherein to online one or more of the fabric devices comprises:
creating, for each fabric device to be onlined, a reference within the host system's operating system for processes in the host system to communicate with the fabric device.

20. The host system as recited in claim 19, wherein said fabric configuration interface is further configured to initiate said configuration operation according to said specified configuration repository by requesting said fabric driver to create an operating system node for each fabric device identified in the specified configuration repository that is desired to be configured.

21. The host system as recited in claim 19, wherein said fabric configuration interface is further configured to initiate said configuration operation according to said specified configuration repository by requesting said fabric driver to delete or deactivate an existing operating system node for each fabric device identified in the specified configuration repository that is desired to be unconfigured.

22. The host system as recited in claim 21, wherein:
said fabric driver is configured to, in response to a request to deactivate or delete an existing operating system node, generate a warning that a fabric device whose node was requested to be deleted or deactivated is in-use for the host system; and
said fabric configuration interface is configured to, in response to receiving said warning, cancel the deactivation or deletion of the operating system node for the in-use fabric device.

23. The host system as recited in claim 19, wherein said fabric configuration interface is configured to provide a standard interface for verifying the availability of each fabric device identified in a specified one of said configuration repositories.

24. The host system as recited in claim 23, wherein said standard interface for verifying is configured to, in response to a verification request specifying one of said configuration repositories, request said fabric driver to verify the availability on the fabric of the fabric devices identified in the specified configuration repository.

25. The host system as recited in claim 24, wherein said fabric driver is configured to, in response to said request to verify, access a fabric name server to determine availability of the fabric devices identified in the specified configuration repository.

26. The host system as recited in claim 24, wherein if one of the fabric devices is determined not to be available in response to said verification request, said fabric configuration interface is configured to obtain a list of available fabric devices from the fabric driver for selecting a replacement for the unavailable fabric device.

27. The host system as recited in claim 19, wherein said standard interface for creating said configuration repositories is configured to:
   receive a request for a list of fabric devices available to the host system;
   obtain said list from said fabric driver;
   receive an indication of selected fabric devices from said list with desired configuration status for each selected fabric device; and
   create one of said configuration repositories identifying the selected fabric devices.

28. The host system as recited in claim 27, wherein said standard interface for creating said configuration repositories is configured to display said list to a user.

29. The host system as recited in claim 19, wherein said fabric configuration interface is configured to provide a standard interface for modifying said configuration repositories, wherein said standard interface for modifying is configured to:
   receive a request to delete an entry for one of the fabric devices identified in a specified configuration repository; and
   in response to said request to delete, update the specified one of said configuration repositories to delete said entry.

30. The host system as recited in claim 19, wherein said fabric configuration interface is configured to provide a standard interface for modifying said configuration repositories, wherein said standard interface for modifying is configured to:
   obtain a list of fabric devices available to the host system;
   receive an indication of one or more selected fabric devices from said list with desired configuration status for each selected fabric device to be added to a specified one of said configuration repositories; and
   update the specified one of said configuration repositories to add entries for each selected fabric device.

31. The host system as recited in claim 19, wherein one of said plurality of configuration repositories is a persistent repository indicating a default fabric device configuration for the host system.

32. The host system as recited in claim 31, wherein said fabric configuration interface is further configured to, in response to a reboot of the host system, access said persistent repository and request said fabric driver to configure for the host system the fabric devices identified in the persistent repository according to said default fabric device configuration.

33. A computer readable medium having stored thereon data representing sequences of instructions, wherein the sequences of instructions are executable by one or more processors to implement:
   storing a plurality of configuration repositories, wherein each one of said plurality of configuration repositories identifies one or more fabric devices;
   receiving a request to online fabric devices according to a specified one of said plurality of configuration repositories;
   accessing the specified configuration repository; and
   requesting a configuration operation to online, for the host system, one or more of the fabric devices identified in the specified configuration repository;
   wherein to online one or more of the fabric devices comprises:
      creating, for each fabric device to be onlined, a reference within the host system's operating system for processes in the host system to communicate with the fabric device.

34. The computer readable medium as recited in claim 33, wherein said requesting a configuration operation comprises requesting a fabric driver to create an operating system node for each identified fabric device not already online and requested to be brought online.

35. The computer readable medium as recited in claim 33, wherein said requesting a configuration operation comprises:
   indicating a desired configuration status for each fabric device identified in the specified configuration repository;
   requesting a fabric driver to create an operating system node for each identified fabric device not already online whose desired configuration status is configure; and
   requesting a fabric driver to deactivate or delete an operating system node for each identified fabric device whose desired configuration status is unconfigure.

36. The computer readable medium as recited in claim 35, wherein the sequences of instructions are further executable to implement, in response to said requesting a fabric driver to deactivate or delete an operating system node:
   receiving a warning that one of the identified fabric devices whose desired configuration status is unconfigure is in-use for the host system; and
   in response to said receiving a warning, canceling deactivation or deletion of the operating system node for the in-use fabric device.

37. The computer readable medium as recited in claim 33, wherein said requesting a configuration operation comprises requesting a fabric driver to verify the availability of each identified fabric device on the fabric.

38. The computer readable medium as recited in claim 33, wherein the sequences of instructions are further executable to implement creating one of said configuration repositories by:
   receiving a request for a list of fabric devices available to a host system;
   providing said list in response to the request;
   receiving an indication of selected fabric devices from said list; and
   creating one of said plurality of configuration repositories for identifying the selected fabric devices.

39. The computer readable medium as recited in claim 38, wherein said creating one of said configuration repositories further comprises requesting a configuration operation to configure for the host system the selected fabric devices from said list according to their indicated desired configuration status.

40. The computer readable medium as recited in claim 38, wherein said providing said list comprises obtaining said list from a fabric driver.

41. The computer readable medium as recited in claim 38, wherein said providing said list comprises displaying said list to a user.

42. The computer readable medium as recited in claim 33, wherein the sequences of instructions are further executable to implement modifying one of said configuration repositories by:

providing entries from a specified one of said configuration repositories;

receiving a request to delete an entry for one of the fabric devices identified in the specified configuration repository; and in response to said request to delete, updating the specified one of said configuration repositories to delete said entry.

43. The computer readable medium as recited in claim 33, wherein the sequences of instructions are further executable to implement modifying one of said configuration repositories by:

providing entries from a specified one of said configuration repositories;

receiving a request to change the desired configuration status for one of the fabric devices identified in the specified configuration repository; and in response to said request to change the desired configuration status, updating the specified one of said configuration repositories to indicate the requested change to the desired configuration status.

44. The computer readable medium as recited in claim 43, wherein said modifying one of said configuration repositories further comprises requesting a fabric driver to verify the availability on the fabric of each fabric device identified in the modified configuration repository.

45. The computer readable medium as recited in claim 43, wherein said modifying one of said configuration repositories further comprises requesting a fabric driver to create an operating system node for each fabric device not already online whose desired configuration status is configure.

46. The computer readable medium as recited in claim 33, wherein the sequences of instructions are further executable to implement modifying one of said configuration repositories by:

providing a list of fabric devices available to the host system;

receiving an indication of one or more selected fabric devices from said list with desired configuration status for each selected fabric device to be added to a specified one of said configuration repositories; and updating the specified one of said configuration repositories to add entries for each selected fabric device.

47. The computer readable medium as recited in claim 46, wherein said modifying one of said configuration repositories further comprises requesting a fabric driver to verify the availability on the fabric of each fabric device identified in the modified configuration repository prior to said updating.

48. The computer readable medium as recited in claim 46, wherein said modifying one of said configuration repositories further comprises requesting a fabric driver to create an operating system node for each fabric device not already online whose desired configuration status is to be configured for the modified configuration repository.

49. The computer readable medium as recited in claim 33, wherein one of said plurality of configuration repositories is a persistent repository indicating a default fabric device configuration for the host system.

50. The computer readable medium as recited in claim 49, wherein the sequences of instructions are further executable to implement, in response to a reboot of the host system, reading said persistent repository and requesting a configuration operation to configure for the host system the fabric devices identified in the persistent repository according to said default fabric device configuration.

* * * * *